(12) United States Patent
Witherbee

(10) Patent No.: US 10,077,866 B2
(45) Date of Patent: Sep. 18, 2018

(54) STUD-TO-STUD MOUNTING BRACKET FOR ELECTRICAL OR COMMUNICATION DEVICE

(71) Applicant: Cooper Technologies Company, Houston, TX (US)

(72) Inventor: Martin Lee Witherbee, Godfrey, IL (US)

(73) Assignee: Cooper Technologies Company, Houston, TX (US)

( * ) Notice: Subject to any disclaimer, the term of this patent is extended or adjusted under 35 U.S.C. 154(b) by 199 days.

(21) Appl. No.: 14/733,379

(22) Filed: Jun. 8, 2015

(65) Prior Publication Data

US 2016/0360629 A1 Dec. 8, 2016

Related U.S. Application Data

(60) Provisional application No. 62/008,954, filed on Jun. 6, 2014.

(51) Int. Cl.
| | | |
|---|---|---|
| *H02G 3/14* | (2006.01) | |
| *F16M 13/02* | (2006.01) | |
| *H02G 3/12* | (2006.01) | |

(52) U.S. Cl.
CPC ............ *F16M 13/02* (2013.01); *H02G 3/125* (2013.01)

(58) Field of Classification Search
CPC ........ H01B 17/00; H01B 17/26; H01B 17/30; H01B 17/583; H05K 2201/2036; H05K 3/301; H05K 3/303; H05K 7/14; H05K 7/142; B60R 16/0222; H02G 3/083; H02G 3/22; H02G 3/125; F16M 13/02

See application file for complete search history.

(56) References Cited

U.S. PATENT DOCUMENTS

| | | | |
|---|---|---|---|
| 1,056,759 A | | 3/1913 | Mallery |
| 1,211,182 A | | 1/1917 | Kruse |
| 1,288,024 A | | 12/1918 | Kendig |
| 1,583,474 A | | 5/1926 | Kruse |
| 1,756,361 A | | 4/1930 | Johnson |
| 1,786,004 A | | 12/1930 | Clayton |
| 1,790,031 A | | 1/1931 | Vaughn |
| 2,023,083 A | | 12/1935 | Knell |
| 2,223,910 A | | 12/1940 | Gallagher |
| 2,881,924 A | | 4/1959 | Kruse et al. |
| 3,182,805 A | | 5/1965 | Foster, Jr. et al. |
| 4,234,146 A | * | 11/1980 | Shima ............... B66B 7/062 174/117 F |
| 4,967,990 A | * | 11/1990 | Rinderer ............ H02G 3/125 220/3.9 |
| 5,114,105 A | | 5/1992 | Young |
| 5,330,137 A | | 7/1994 | Oliva |
| 5,516,068 A | * | 5/1996 | Rice ................... E04B 9/006 248/300 |
| 5,927,667 A | | 7/1999 | Swanson |

(Continued)

*Primary Examiner* — Pete Lee
(74) *Attorney, Agent, or Firm* — Senniger Powers LLP

(57) ABSTRACT

A mounting bracket for a junction box includes a face plate having left and right edge margins and a central opening. The face plate includes a first set of indicia adjacent a top edge of the central opening and a second set of indicia adjacent a bottom edge of the central opening. Each set of indicia includes ruler graduations indicating a distance from the left edge margin of the face plate to the respective ruler graduation.

13 Claims, 42 Drawing Sheets

(56) References Cited

U.S. PATENT DOCUMENTS

| | | | | |
|---|---|---|---|---|
| 5,931,425 | A * | 8/1999 | Oliva | H02G 3/125 174/58 |
| 6,076,788 | A * | 6/2000 | Akiyama | E04B 9/006 248/200.1 |
| 6,209,836 | B1 | 4/2001 | Swanson | |
| 6,545,214 | B2 * | 4/2003 | Russell | H02G 3/386 174/497 |
| 6,573,449 | B2 | 6/2003 | Vrame | |
| 6,666,419 | B1 | 12/2003 | Vrame | |
| 7,036,782 | B2 | 5/2006 | Cheatham et al. | |
| 7,591,385 | B2 * | 9/2009 | Brooks | B25H 3/04 211/70.6 |
| 8,378,213 | B1 | 2/2013 | Gerardo et al. | |
| 2005/0067541 | A1 | 3/2005 | Dinh et al. | |
| 2005/0176278 | A1 * | 8/2005 | Cheatham | H02G 3/125 439/92 |
| 2010/0006723 | A1 * | 1/2010 | Yan | H02G 3/125 248/201 |
| 2014/0103180 | A1 * | 4/2014 | Birli | H02G 3/125 248/274.1 |
| 2014/0263865 | A1 * | 9/2014 | Salian | H02G 3/121 248/49 |

* cited by examiner

STUD-TO-STUD MOUNTING BRACKET FOR ELECTRICAL OR COMMUNICATION DEVICE

FIELD OF THE DISCLOSURE

The present disclosure generally relates to a mounting bracket for mounting an electrical or communication device on a wall stud.

BACKGROUND OF THE DISCLOSURE

Typically, an electrical or communication device is installed in a building using a mounting bracket. The communication device is fastened to the mounting bracket, and in turn, the mounting bracket is fastened to framing (e.g., a wall stud). In some circumstances, junction boxes are used to house and protect electrical and communication devices, such as electrical outlets, electrical switches, associated electrical wiring, communication terminals (e.g., terminals for fiber optics), and associated communication cables (e.g., optical fiber cables). The junction box is secured to the mounting bracket, so that, in turn, the electrical or communication device is secured to the mounting bracket.

SUMMARY OF THE DISCLOSURE

In one aspect, a mounting bracket for a junction box includes a face plate having left and right edge margins and a central opening. The face plate includes a first set of indicia adjacent a top edge of the central opening and a second set of indicia adjacent a bottom edge of the central opening. Each set of indicia comprises ruler graduations indicating a distance from the left edge margin of the face plate to the respective ruler graduation.

In another aspect, a mounting bracket for a junction box comprises a face plate having upper and lower edge margins. An upper channel extends upwardly from the upper edge margin and a lower channel extends downwardly from the lower edge margin. Each of the upper and lower channels includes an enlarged end portion at one end thereof. Each enlarged end portion has a width greater than a width of a remainder of the respective channel.

In yet another aspect, a method of adjusting a length of a mounting bracket for a junction box includes removing a removable end portion from a remainder of the mounting bracket and reattaching the removable end portion to the remainder of the mounting bracket to shorten the length of the bracket.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
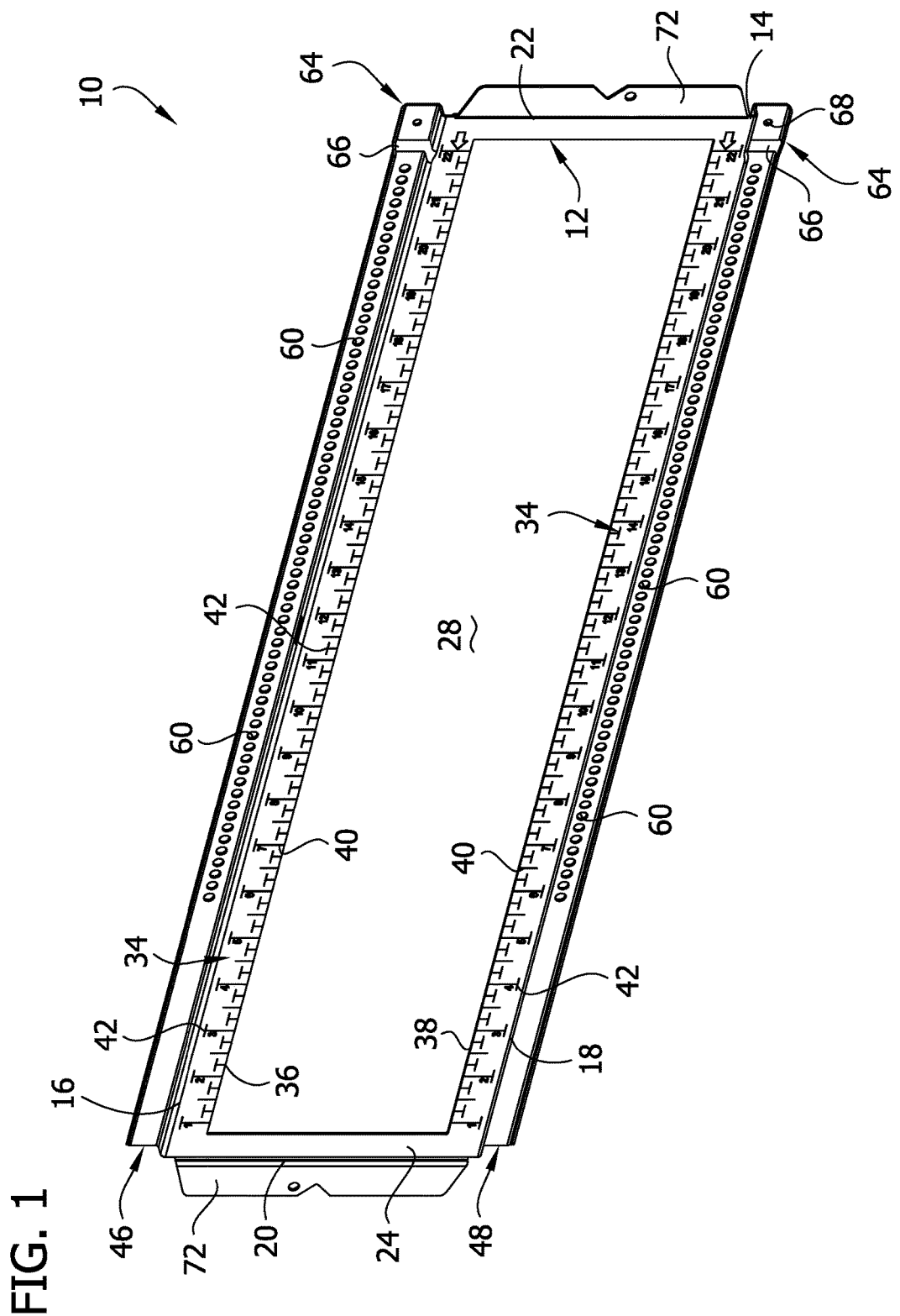
FIG. 1 is a perspective of one embodiment of a stud-to-stud mounting bracket for an electrical or communication device.
Figure 2:
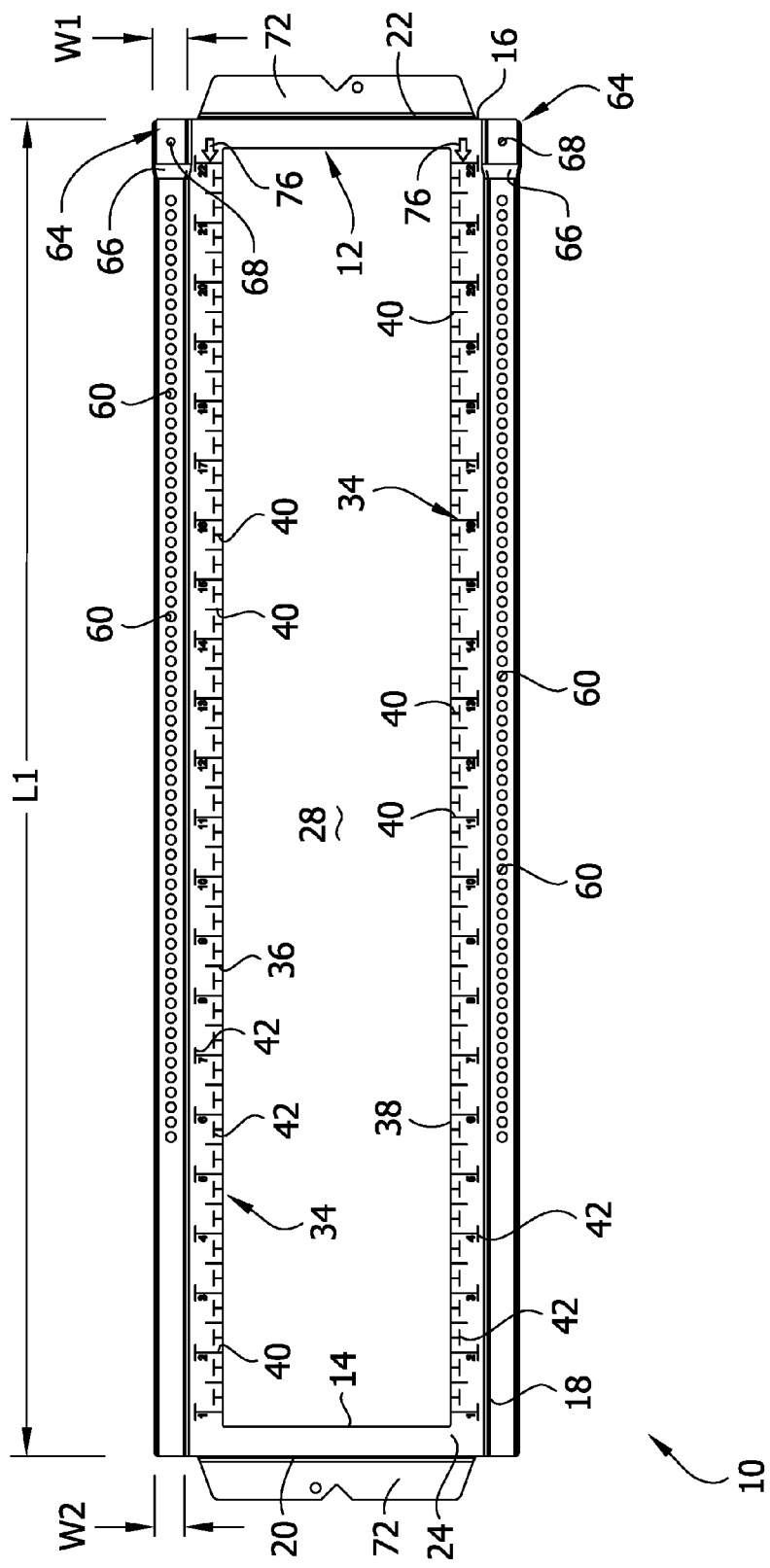
FIG. 2 is a front elevation of the mounting bracket of FIG. 1.
Figure 3:
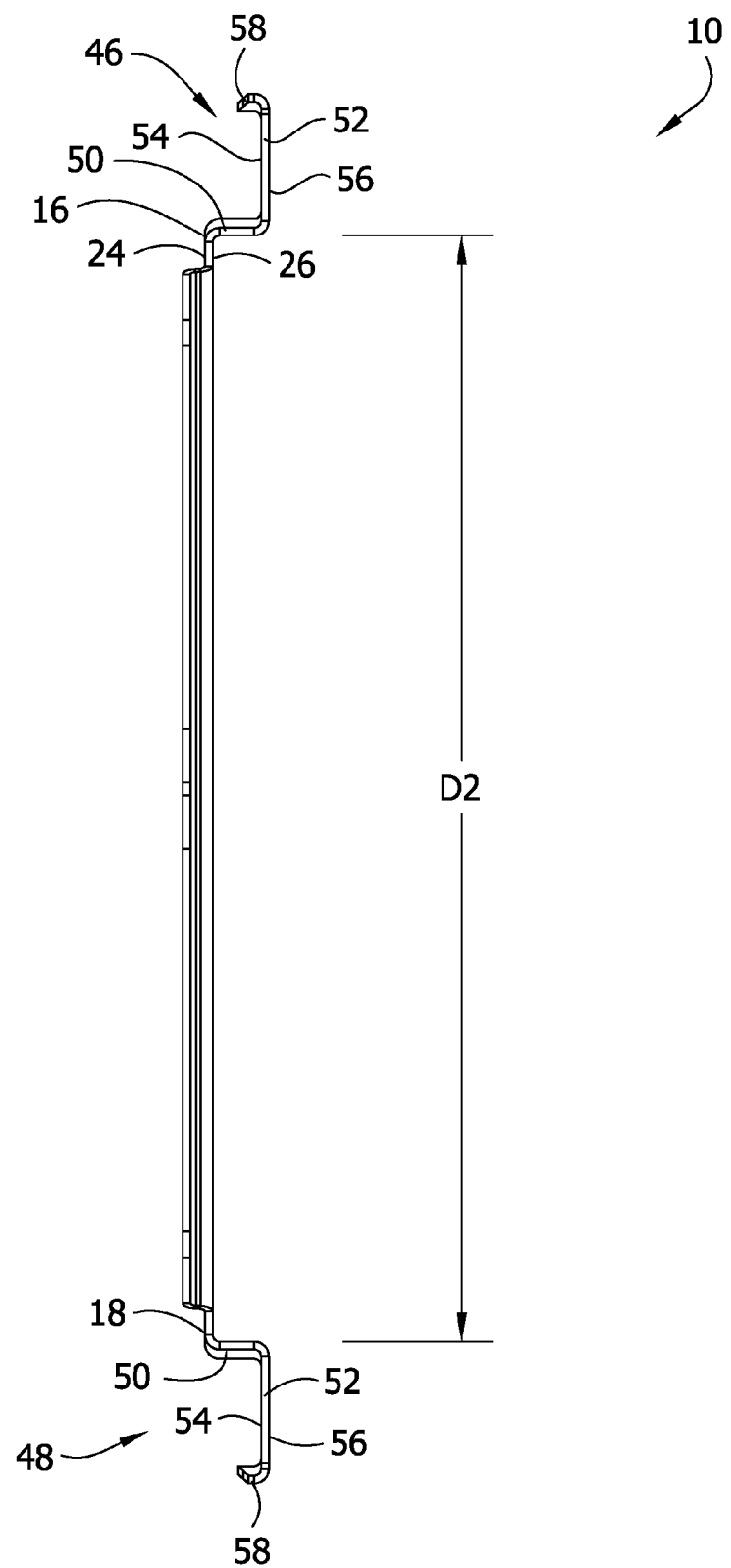
FIG. 3 is a side elevation of the mounting bracket of FIG. 1.
Figure 4:
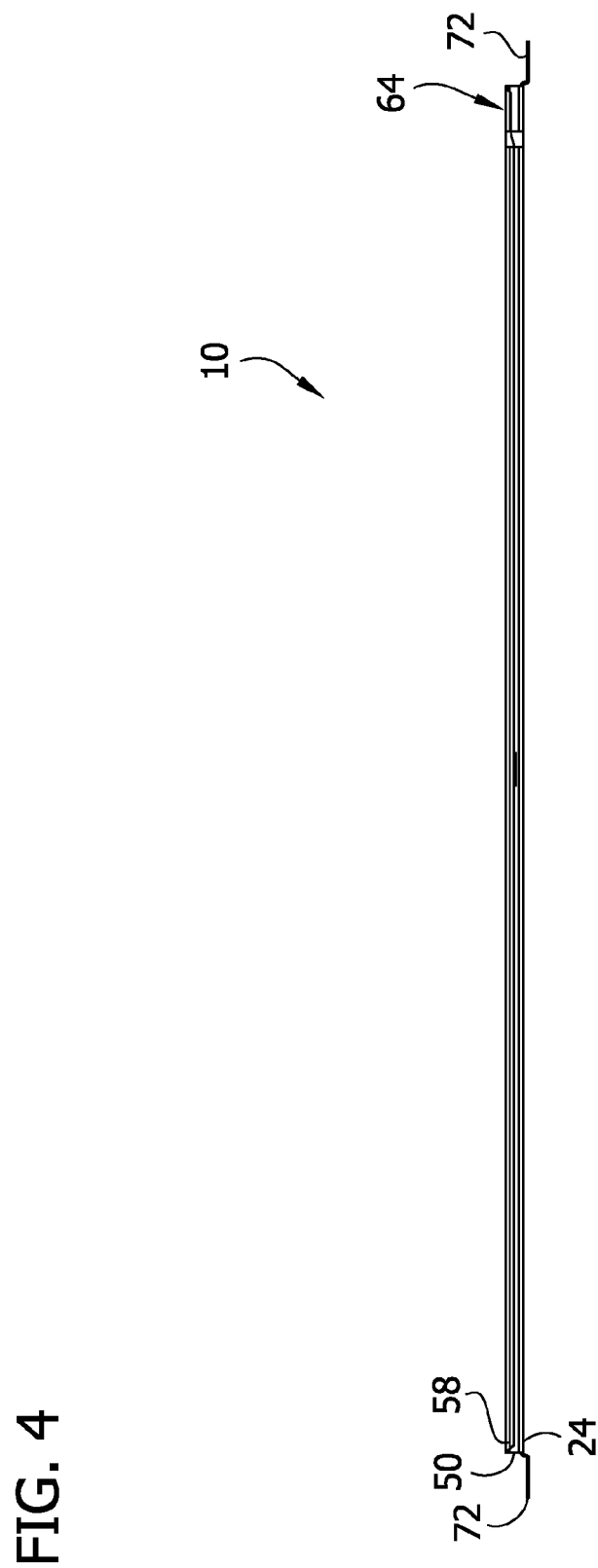
FIG. 4 is a top plan of the mounting bracket of FIG. 1.
Figure 5:
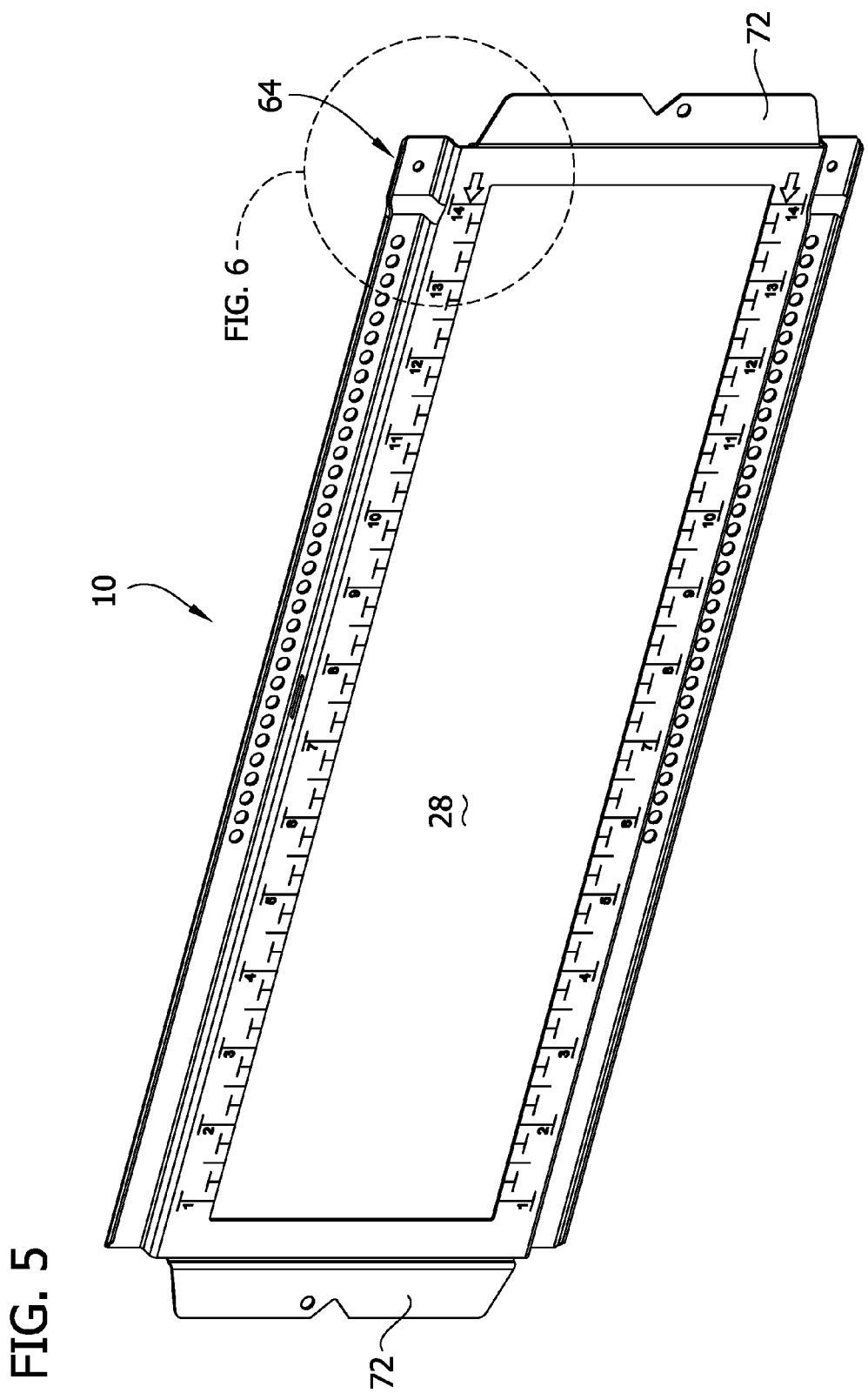
FIG. 5 is a perspective of a stud-to-stud mounting bracket having a shorter initial length than the mounting bracket of FIG. 1.
Figure 6:
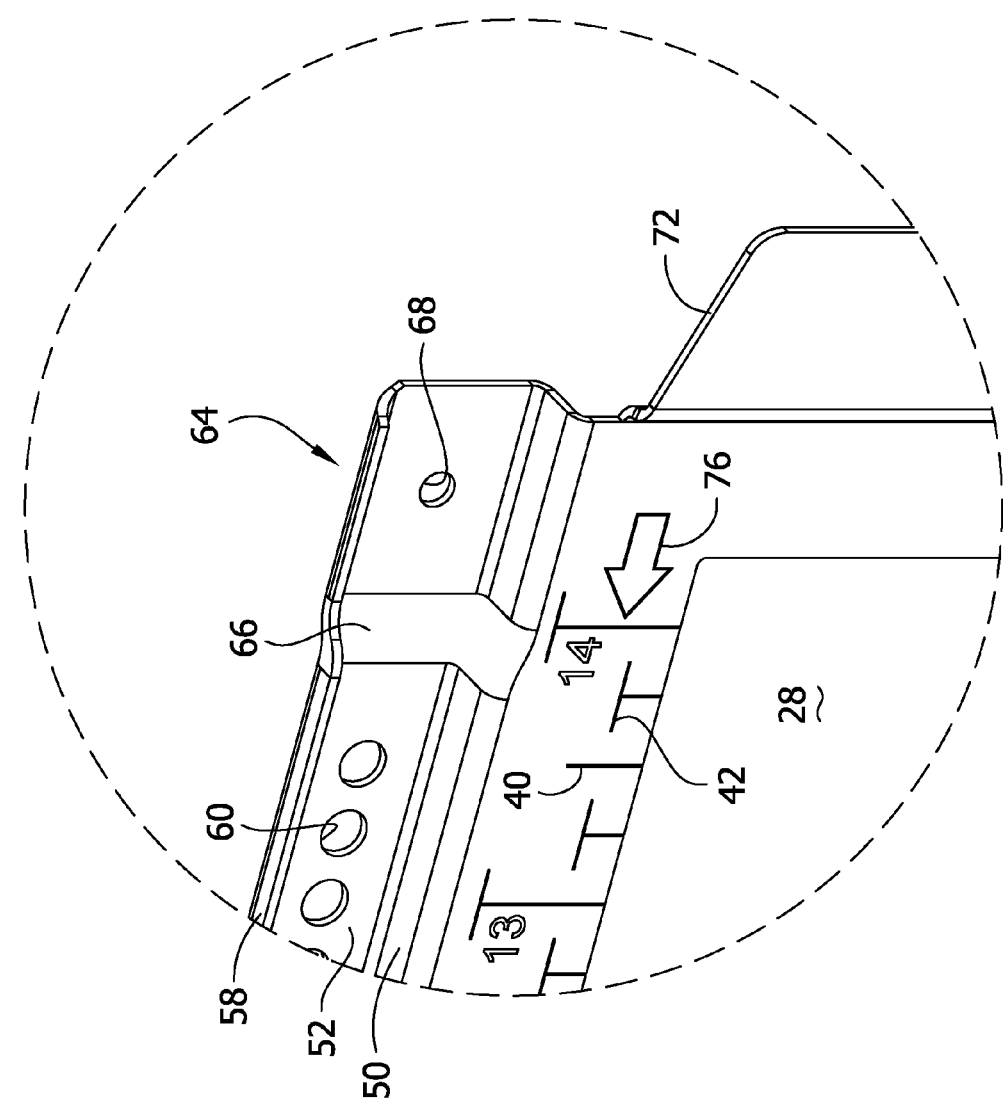
FIG. 6 is an enlarged, partial view of FIG. 5.

Referring to FIGS. 1-36, a first embodiment of an adjustable stud-to-stud mounting bracket for mounting an electrical or communication device (or the like) between wall studs (e.g., metal wall studs) is generally indicated at reference numeral 10. In this embodiment, the mounting bracket 10 is a unitary, one piece construction. The mounting bracket 10 may be formed from a single sheet metal (e.g., steel or aluminum) or other suitable material. In FIGS. 1-8, the mounting bracket 10 is shown in an initial configuration (e.g., having an initial length). As set forth below, in general the mounting bracket 10 is configured to be cut or otherwise configurable from the initial configuration to a different, adjusted configuration (e.g., cut to an adjusted length). The orientation of the mounting bracket 10 in the drawings provides the point of reference for the terms defining relative locations and positions of structures and components of the bracket, including but not limited to the terms "upper," "lower," "left," "right," "top," "bottom," "forward," and "rearward," as used throughout the present disclosure.

Referring still to FIGS. 1-8, the mounting bracket 10 includes a face plate, generally indicated at 12. The face plate 12 includes a main body 14 that is generally rectangular having opposite upper and lower edge margins 16, 18, opposite left and right edge margins 20, 22, a front face 24, a rear face 26, and a large, generally rectangular, central opening 28. The central opening 28 is sufficiently large enough to permit use of the mounting bracket 10 with junction boxes J of different sizes. As an example, the mounting bracket 10 is suitable for use with the junction boxes J having the following known sizes (dimension between upper and lower sides×dimension between left and right sides): 4×4 in, 4¹¹⁄₁₆×4¹¹⁄₁₆ in, and 5×5 in. The central opening 28 is also sufficiently large enough to permit use of different types of box plates 32, such as, for example, a box cover plate having a rearward extending flange surrounding a central opening as described in U.S. Pat. No. 8,575,484, the entirety of which is hereby incorporated by reference, or a conventional plaster ring having a forward extending collar. When fastened to the main body 14, as described below, the junction box J is generally accessible through the central opening 28.

The main body 14 of the face plate 12 includes markings or indicia, such as ruler graduations 34, marking a distance from one or more of the left and right edge margins 20, 22 of the main body. In the illustrated embodiment, ruler graduations 34 indicate measurements from the left edge margin 20 of the main body 14. As illustrated, the front face 24 of the main body 14 includes two sets of ruler graduations 34, one adjacent a top edge 36 of the central opening 28, and one adjacent a bottom edge 38 of the central opening. Although upper and lower sets of ruler graduations 34 are illustrated, it is within the scope of the present invention that the main body 14 includes only one set of ruler graduations. The ruler graduations 34 include hash marks 40 at predetermined intervals. In the illustrated embodiment, the hash marks 40 are spaced at ¼ inch intervals, although other configurations are within the scope of the present invention. Some of the hash marks 40 include horizontal registration lines 42 for use in aligning a box plate 32 on the bracket 10, as described below. In the illustrated embodiment, the 1 inch hash marks 40 of each set of ruler graduations 34 include horizontal registration lines 42 generally aligned with each other, and the ¼ inch hash marks 40 include horizontal registration lines 42 generally aligned with each other and spaced from the horizontal registration lines of the 1 inch hash marks. Although the horizontal registration lines 42 are illustrated as horizontal markings on the hash marks 40, it is within the scope of the present invention that the bracket can include horizontal registration lines not associated with the hash marks, such as continuous horizontal registration lines extending along the front face 24 of the main body 14.

Referring still to FIGS. 1-8, the mounting bracket 10 further includes an upper channel member 46 extending generally horizontally at the upper edge margin 16, and a lower channel member 48 extending generally horizontally at the lower edge margin 18. Each channel member 46, 48 includes a first sidewall 50 extending rearward from the respective upper and lower edge margins 16, 18, a rear wall 52 having a front face 54 and a rear face 56, and a second sidewall 58 extending forward from the rear wall and generally opposing the first sidewall. The first and second sidewalls of the upper channel member are lower and upper sidewalls, respectively, while the first and second sidewalls of the lower channel member are upper and lower sidewalls, respectively. The channel members 46, 48 increase the structural rigidity of the mounting bracket 10. The channel members 46, 48 can also be used to secure additional components to the mounting bracket 10 (e.g., a cable support bracket or a floor stand). The rear walls 52 of the channel members 46, 48 include clearance holes 60 at spaced intervals along the length of the respective channel member to permit adjustability of the bracket 10, as described below. Alternatively, the clearance holes 60 can be omitted within the scope of the present invention.

Each channel member 46, 48 includes at least one enlarged end portion 64 configured to permit adjustability of the bracket 10, as described below. Each channel member 46, 48 can include enlarged end portion 64 at only one end thereof, e.g., the right end portions as illustrated, or at both ends. Each enlarged end portion 64 has an enlarged width W1 extending between the first and second sidewalls that is greater than the width W2 of the remainder of the corresponding channel member 46, 48. A transition portion 66 extends between and connects the enlarged end portion 64 with the remainder of the corresponding channel member 46, 48. The transition portion 66 gradually increases in width toward the enlarged end portion 64. As illustrated, the rear wall 52 of each enlarged end portion 64 includes a pilot hole 68.

Figure 7:
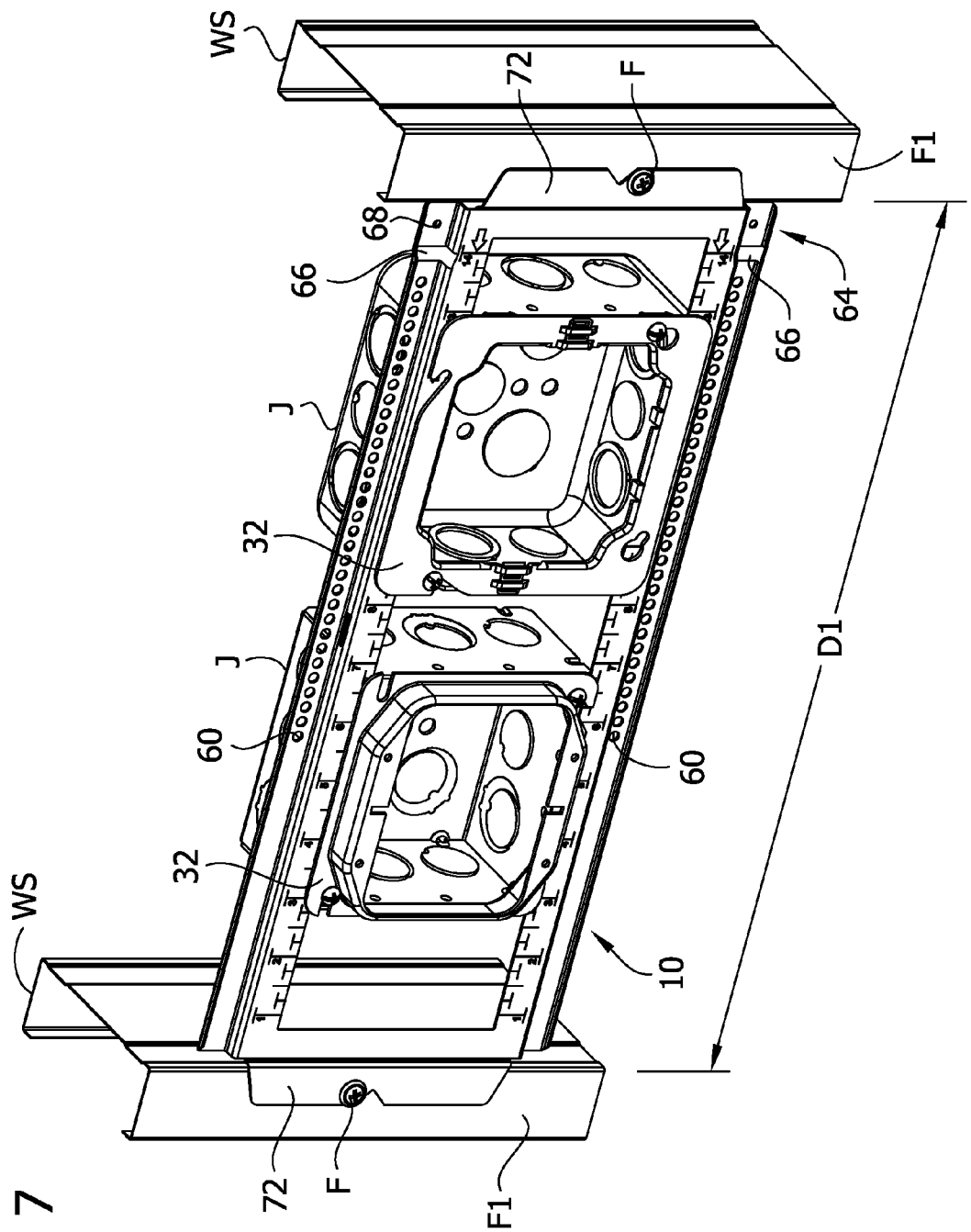
FIG. 7 is a perspective of the mounting bracket of FIG. 5 attached to two wall studs spaced a standard distance apart, with two junction box and a box cover plate assemblies mounted on the mounting bracket.
Figure 8:
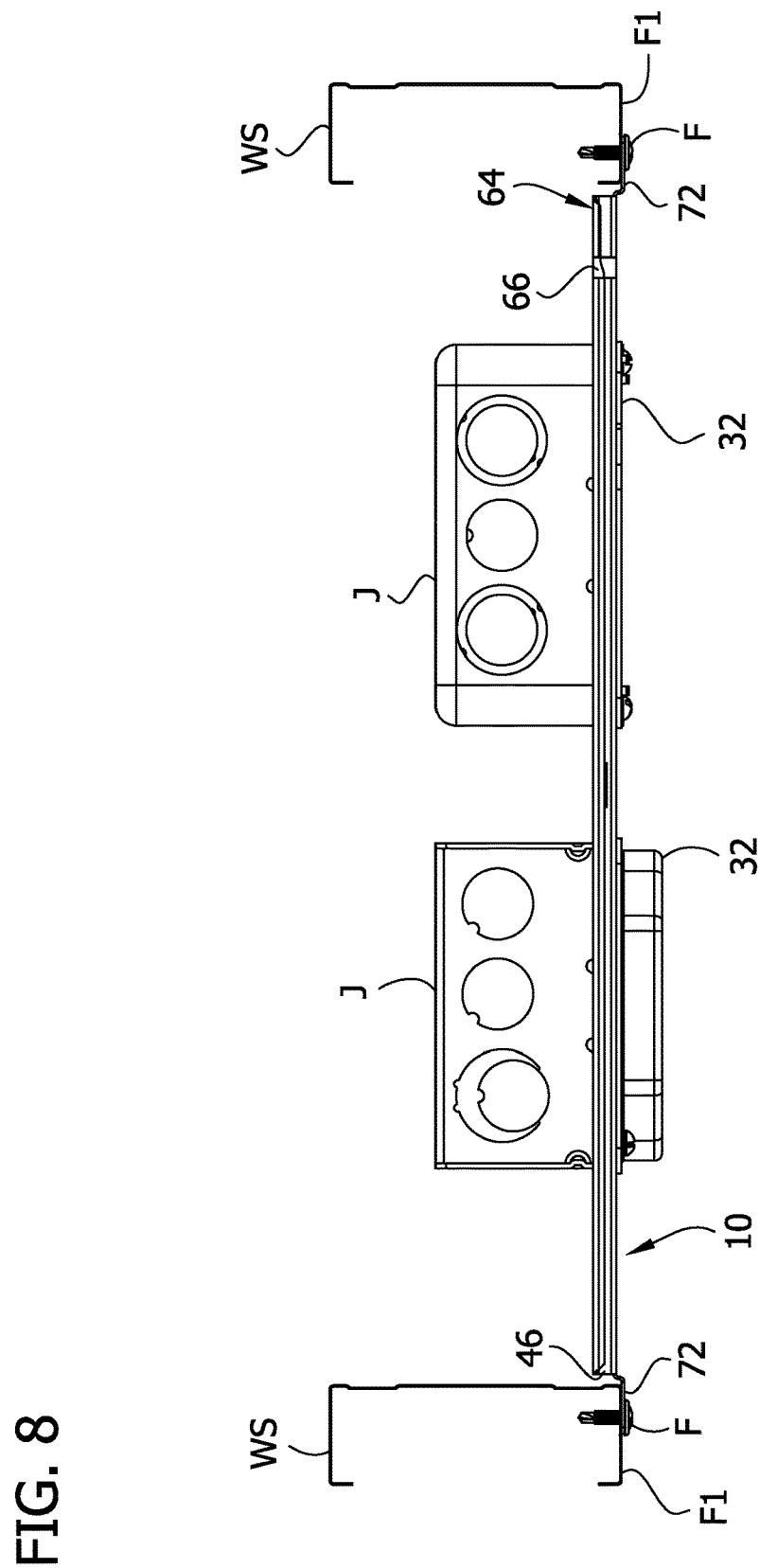
FIG. 8 is a top plan of FIG. 7.
Figure 9:
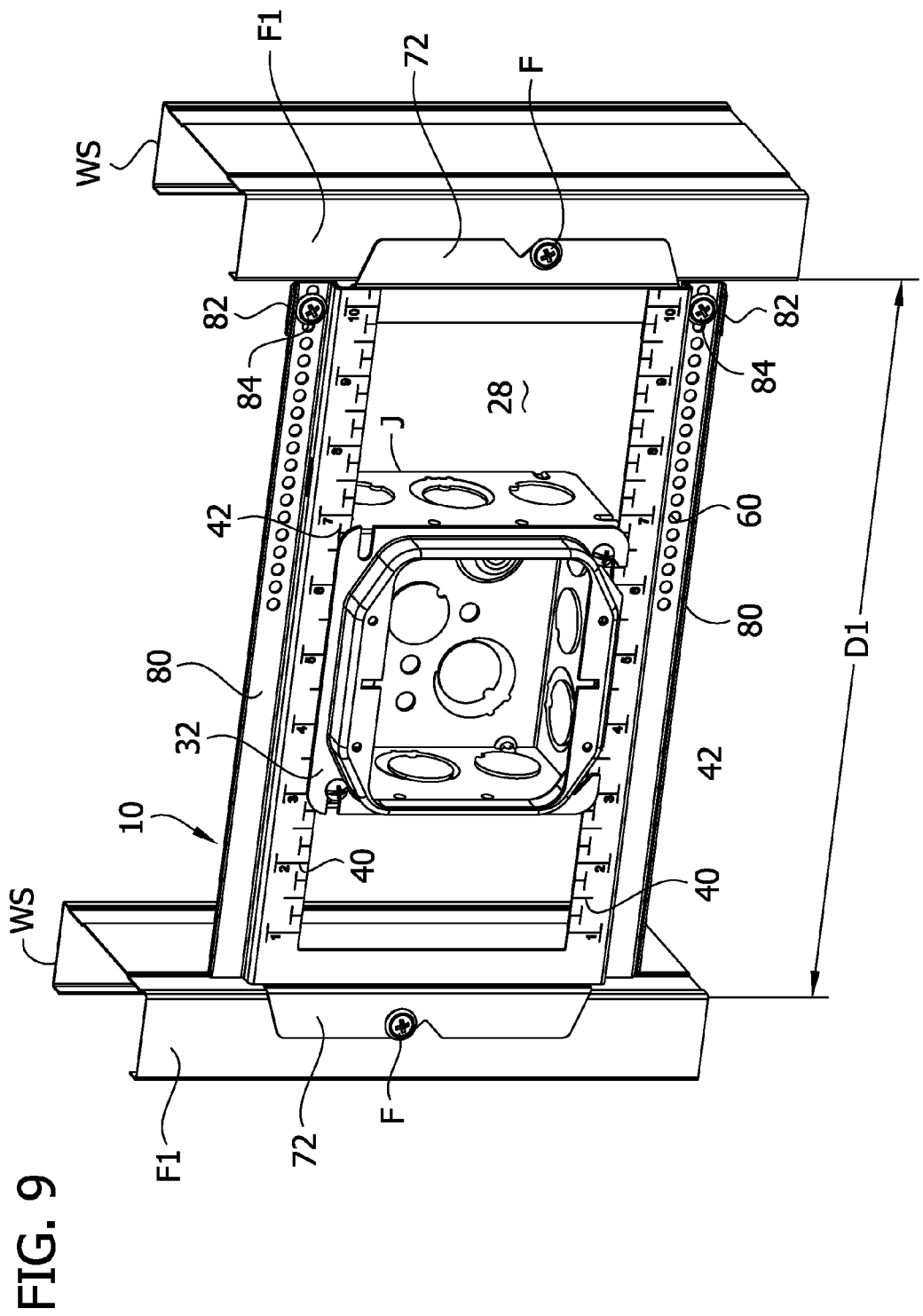
FIG. 9 is a perspective of the mounting bracket of FIG. 5 shortened to an adjusted length and attached to two wall studs spaced a non-standard distance apart, with a junction box and box cover plate assembly mounted on the mounting bracket.
Figure 10:
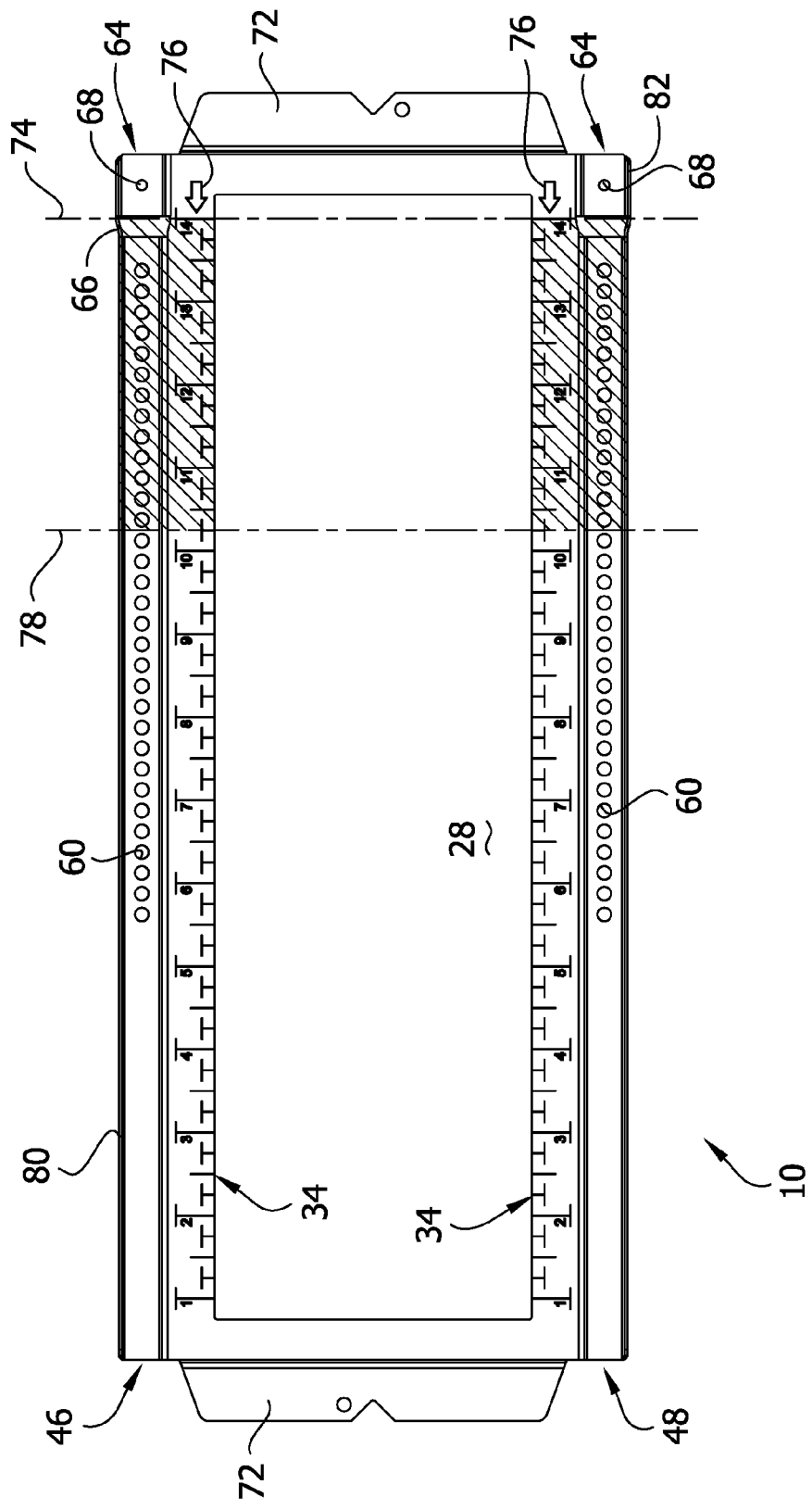
FIG. 10 is a front elevation of the mounting bracket of FIG. 5, illustrating cut lines for shortening the length of the mounting bracket.
Figure 11:
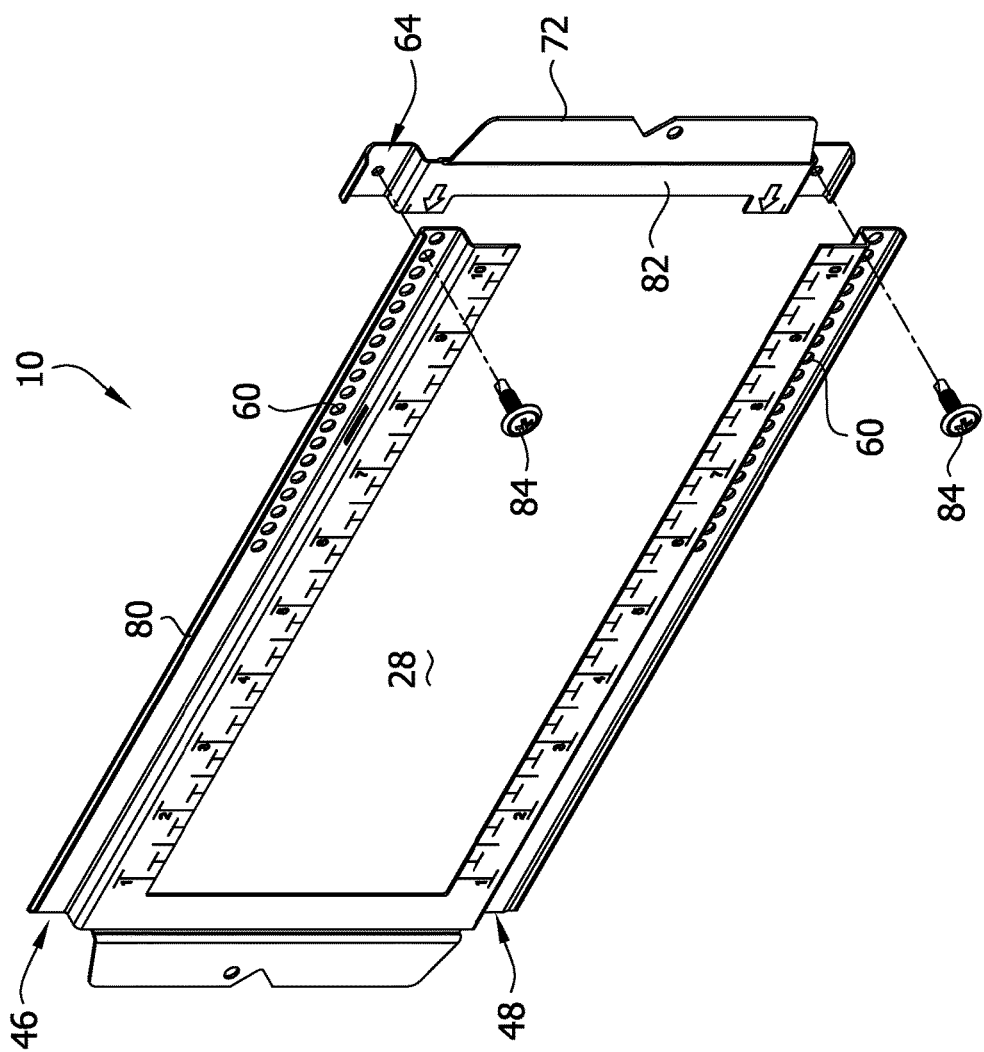
FIG. 11 is a perspective of the mounting bracket of FIG. 10, illustrating movement of the cut portions for shortening the length of the mounting bracket.
Figure 12:
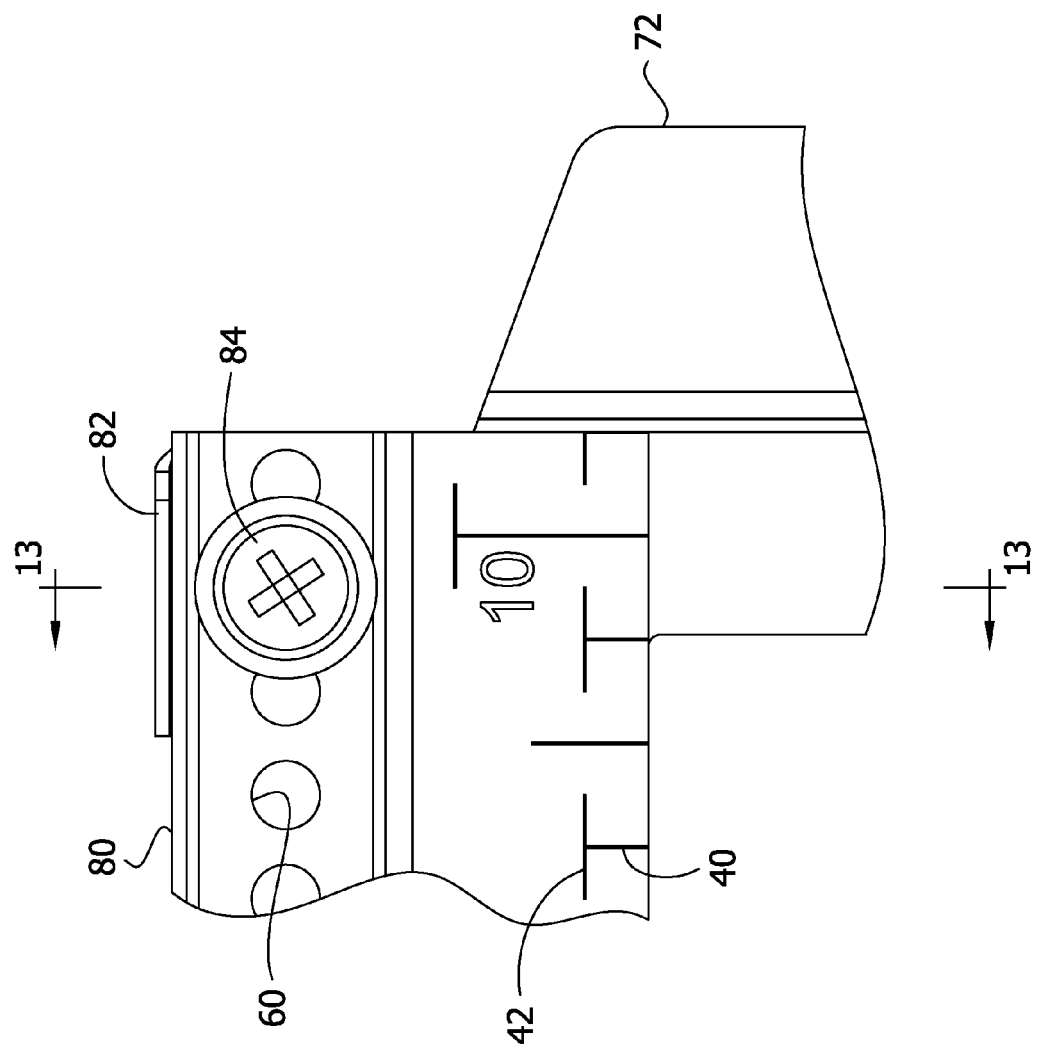
FIG. 12 is an enlarged, partial view of the shortened mounting bracket of FIG. 9.
Figure 13:
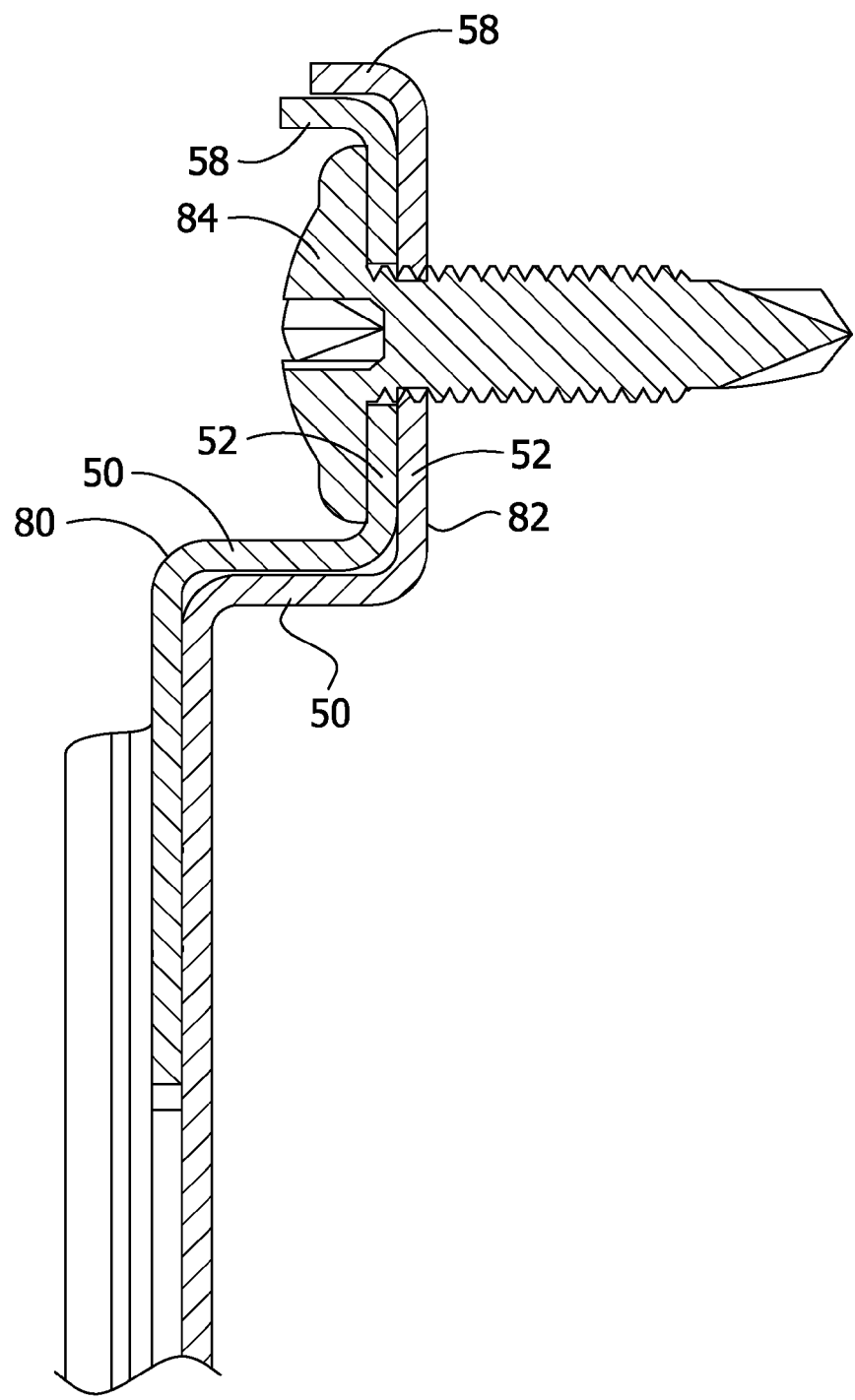
FIG. 13 is a section taken along line 13-13 of FIG. 12.
Figure 14:
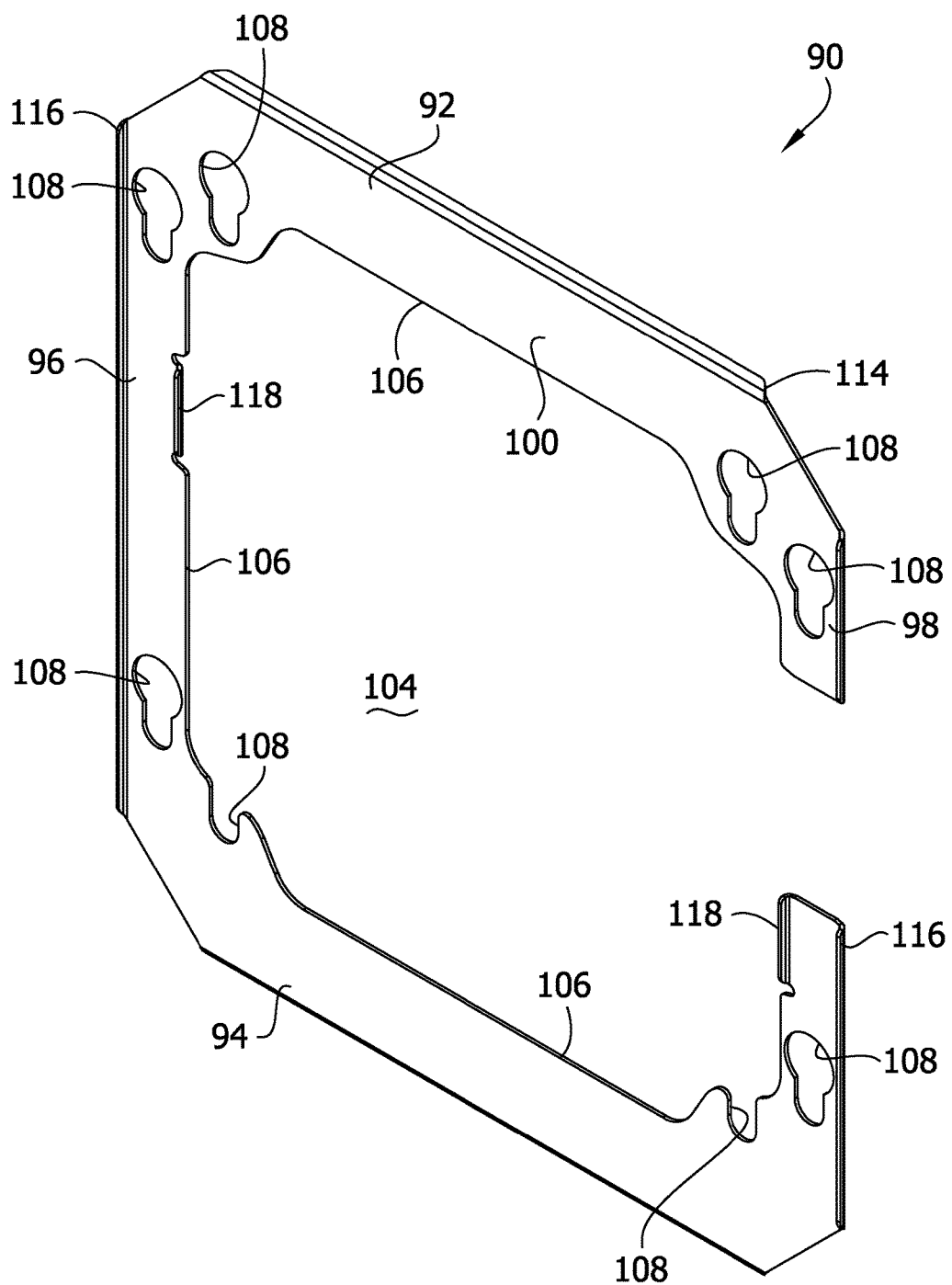
FIG. 14 is a perspective of an alignment plate for use with the mounting bracket.
Figure 15:
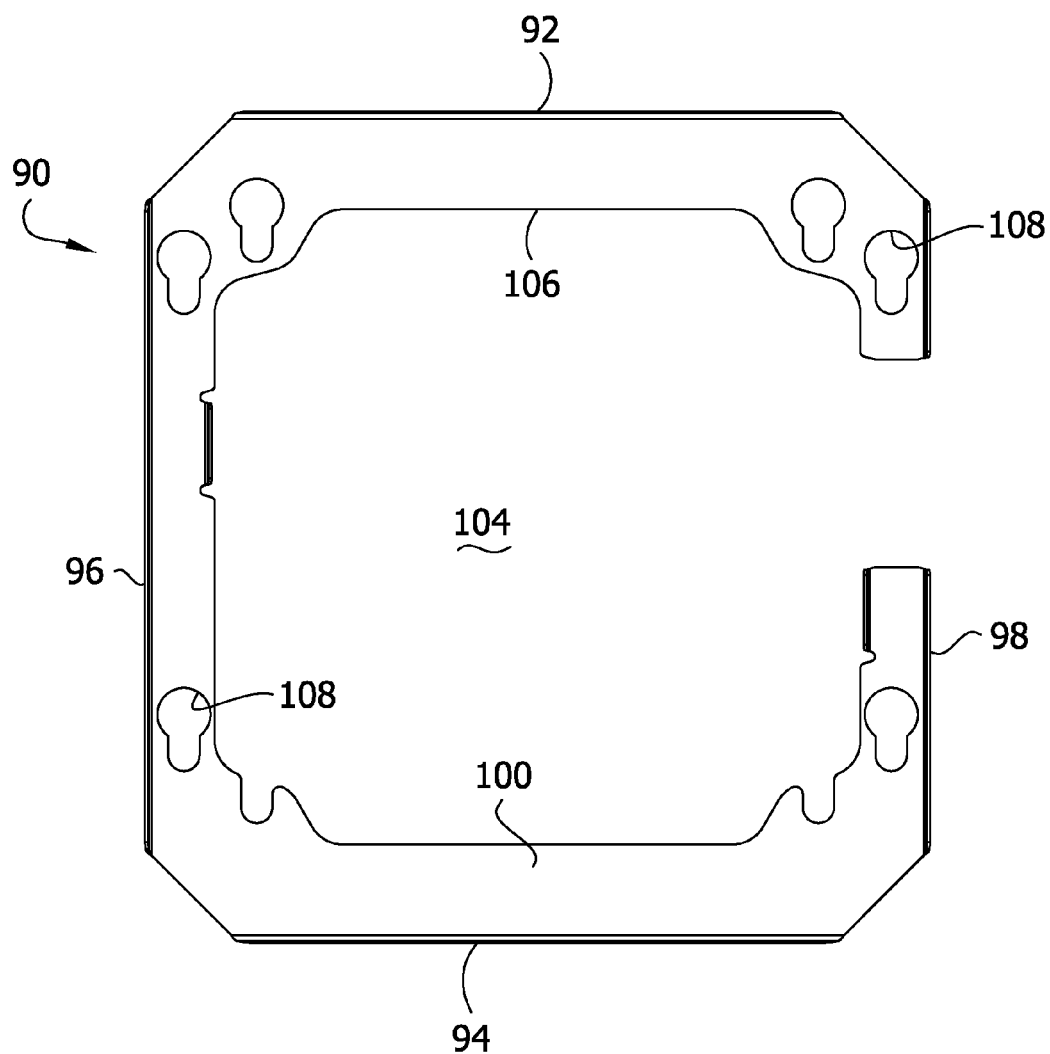
FIG. 15 is a front elevation of the alignment plate of FIG. 14.
Figure 16:
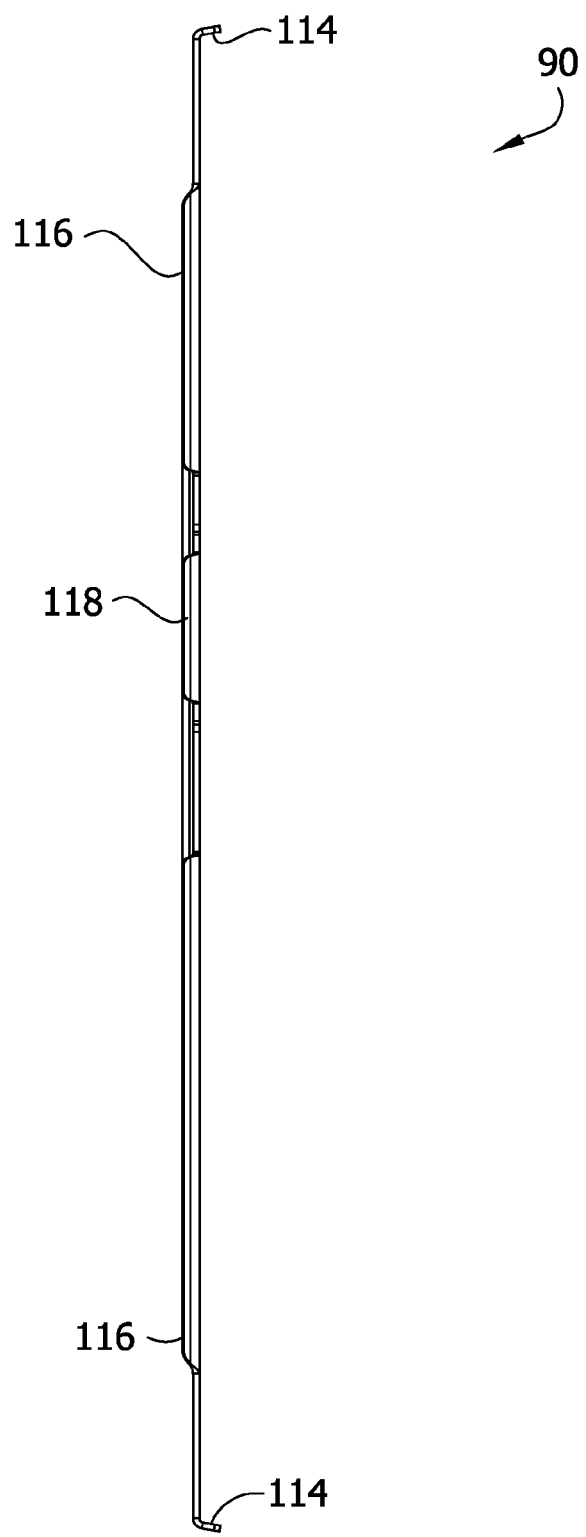
FIG. 16 is a side elevation of the alignment plate of FIG. 14.
Figure 17:
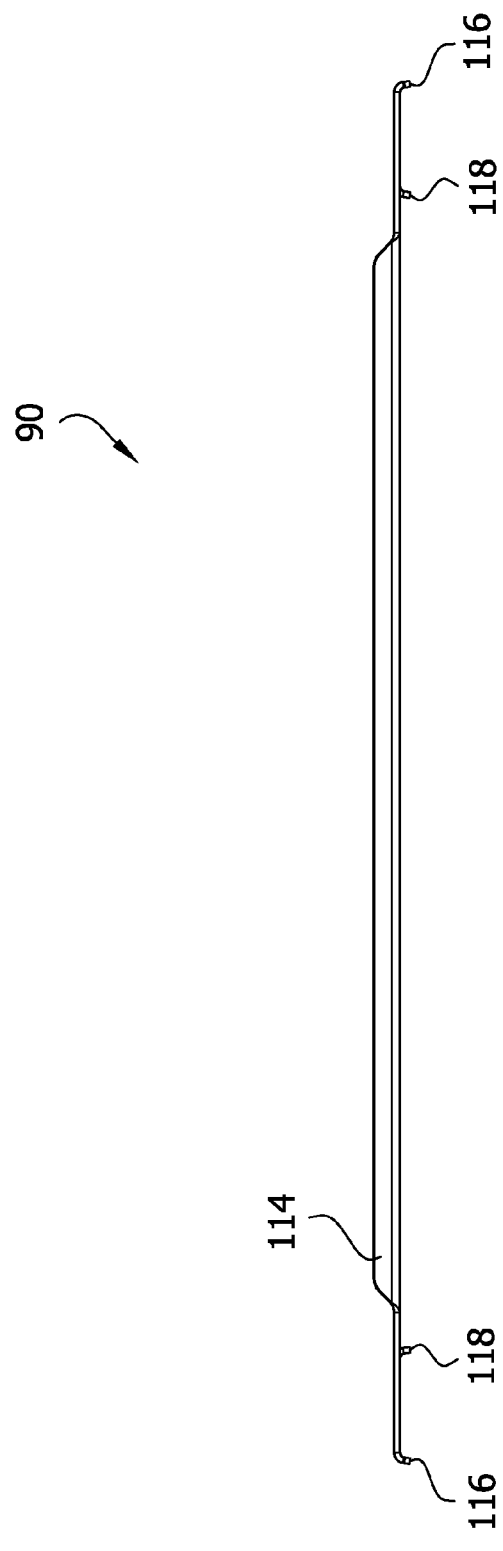
FIG. 17 is a top plan of the alignment plate of FIG. 14.
Figure 18:
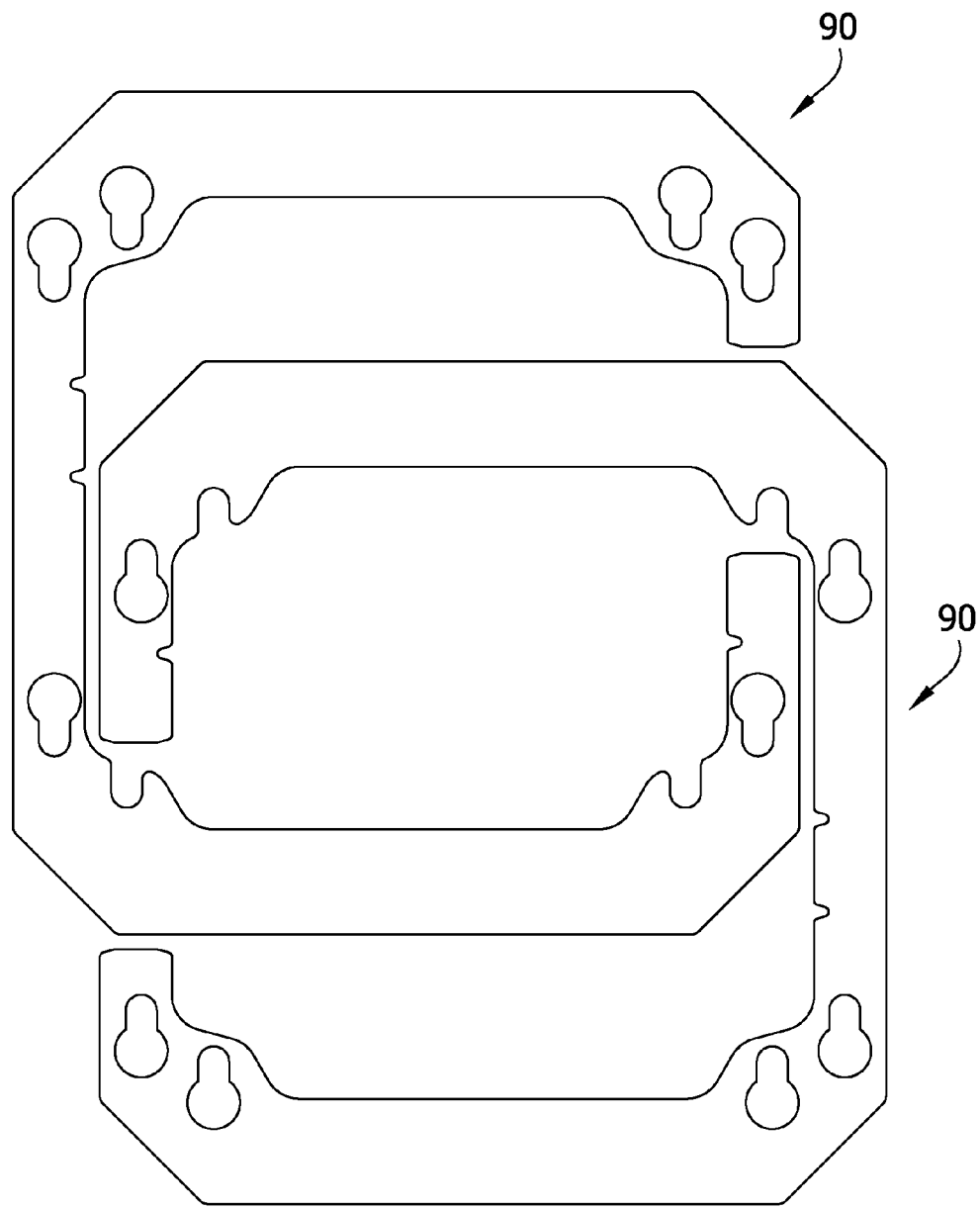
FIG. 18 is a schematic front elevation illustrating two alignment plates nested.
Figure 19:
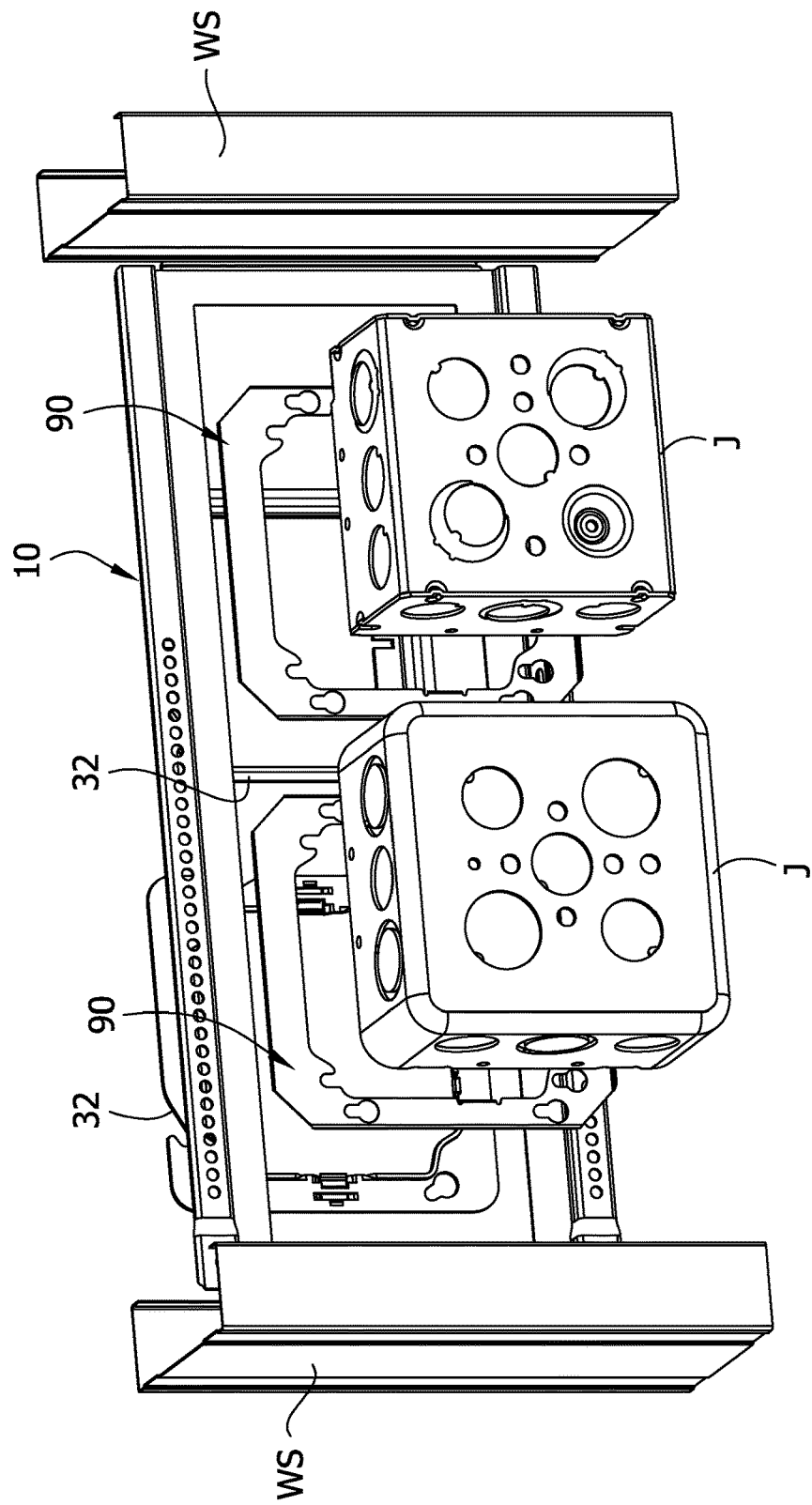
FIG. 19 is a separated rear perspective of the mounting bracket, alignment plate, junction box, and box cover plate.
Figure 20:
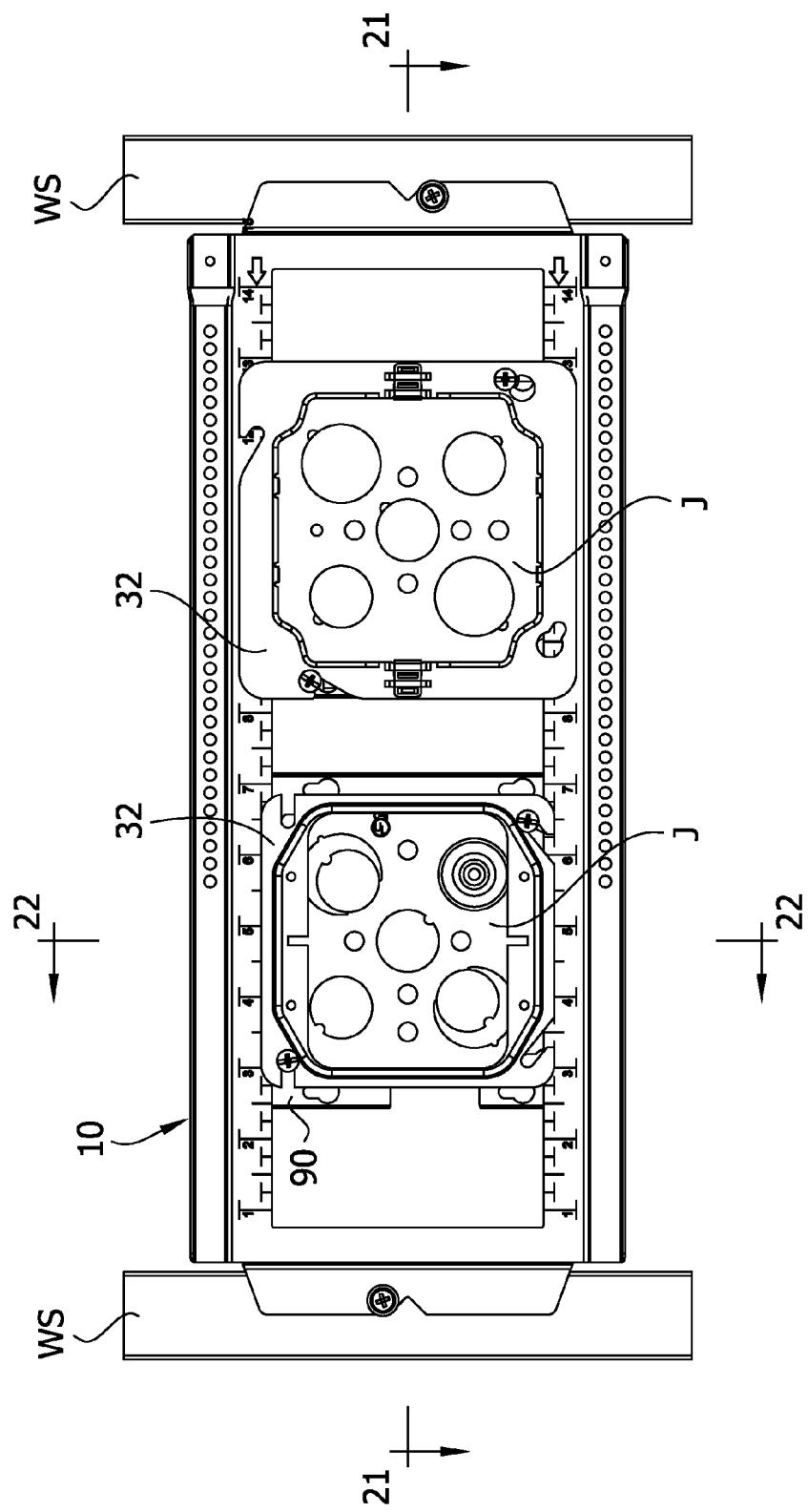
FIG. 20 is a front plan of the mounting bracket attached to two wall studs with two junction box, alignment plate, and box cover plate assemblies mounted on the mounting bracket.
Figure 21:
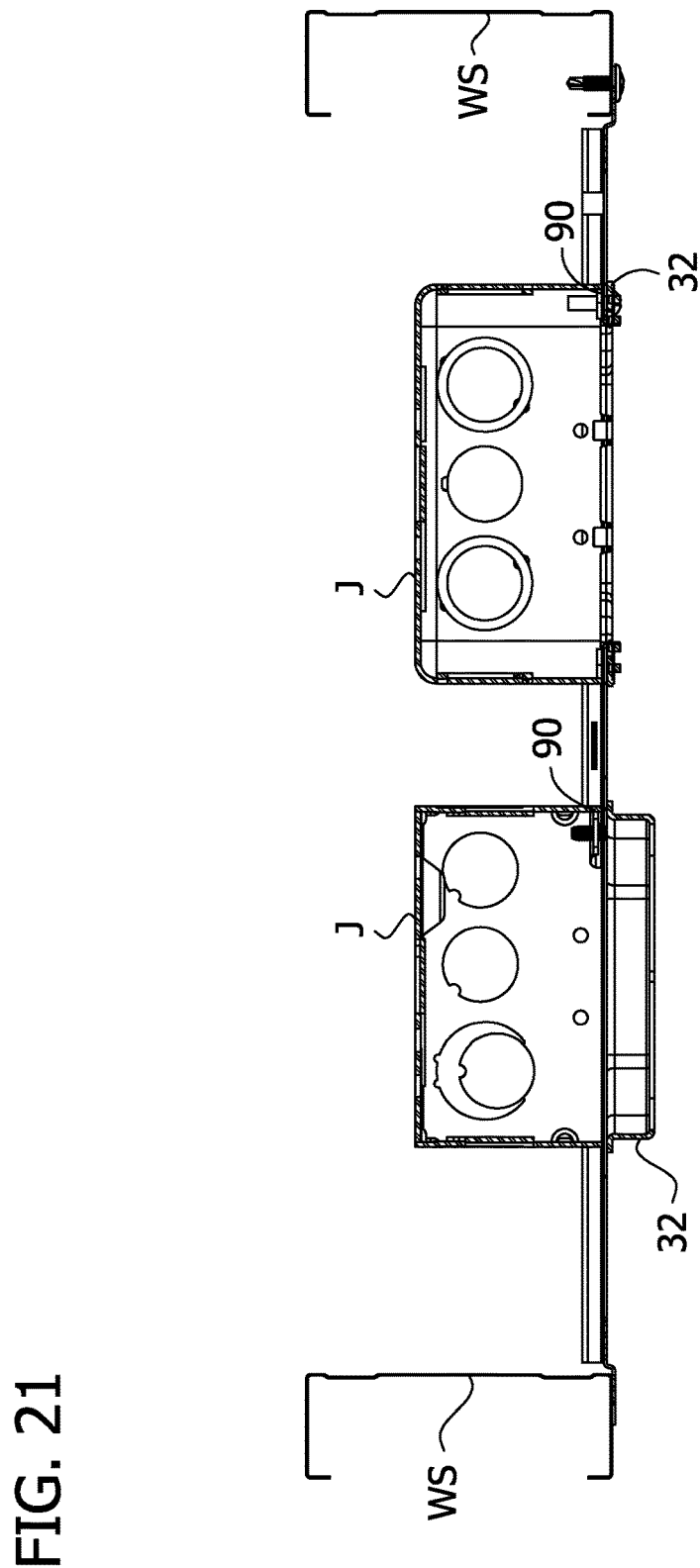
FIG. 21 is a section taken along line 21-21 of FIG. 20.
Figure 22:
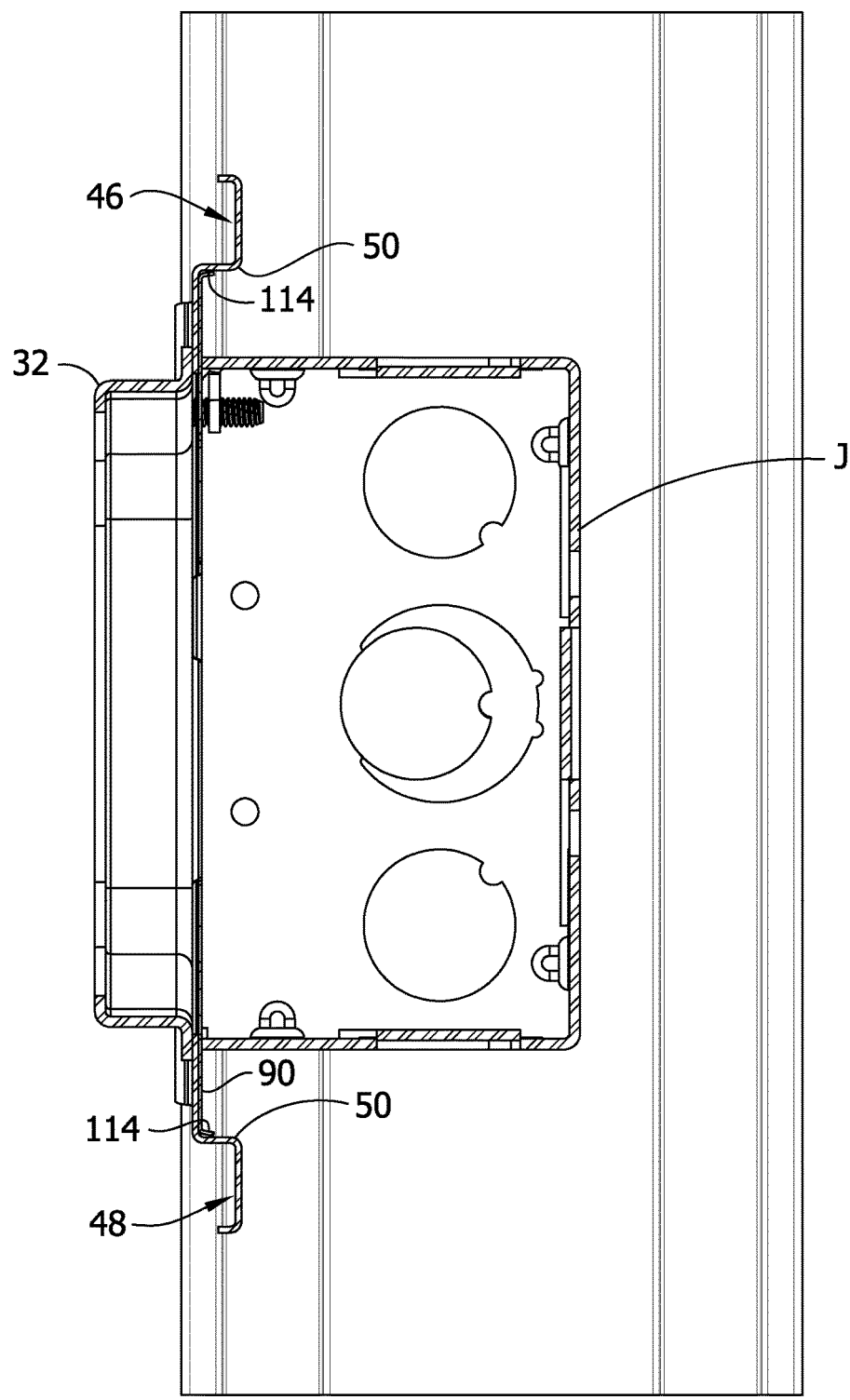
FIG. 22 is a section taken along line 22-22 of FIG. 20.
Figure 23:
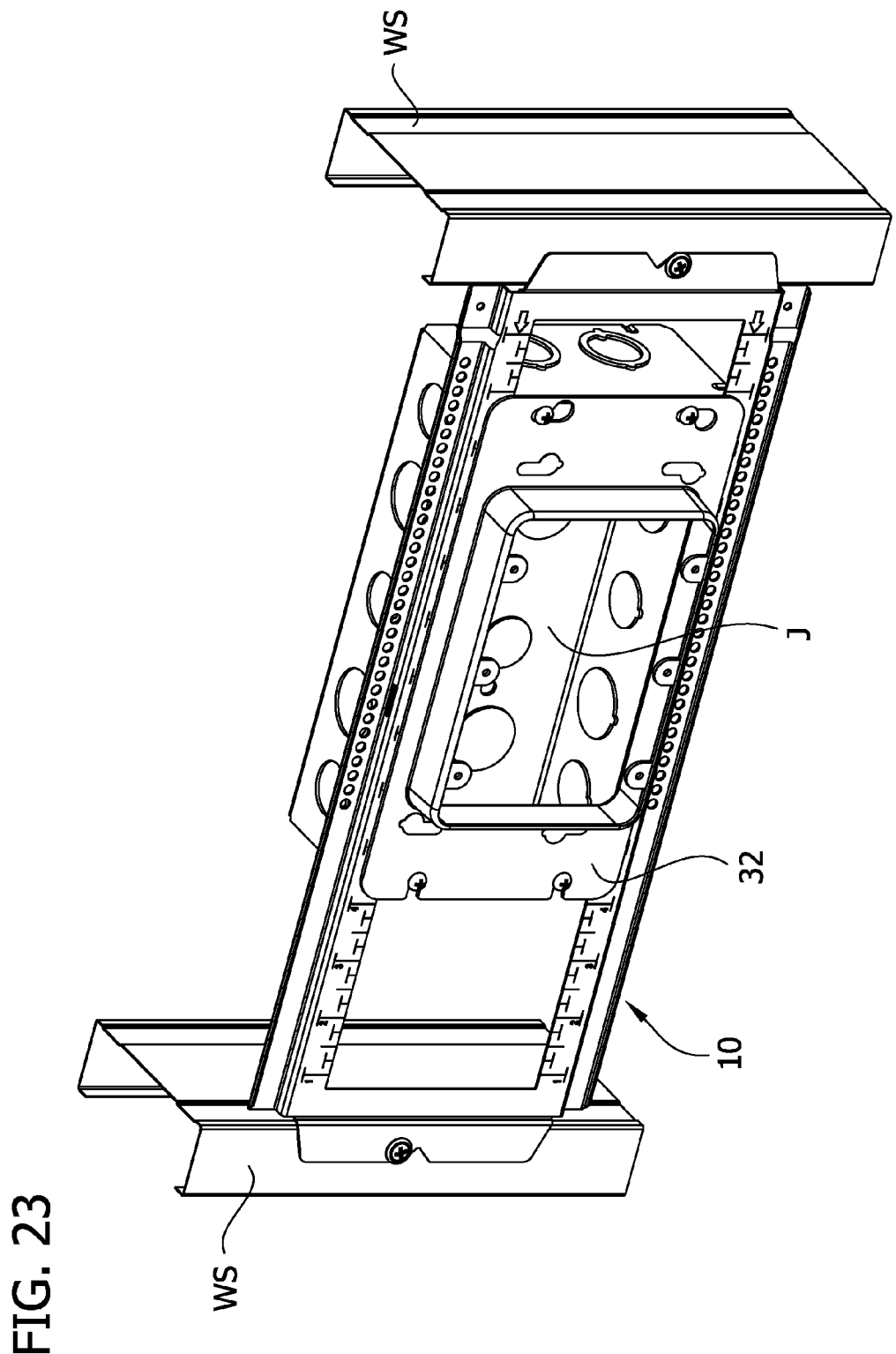
FIG. 23 is a perspective of the mounting bracket attached to two wall studs with a multi-gang junction box and box cover plate assembly mounted on the mounting bracket.
Figure 24:
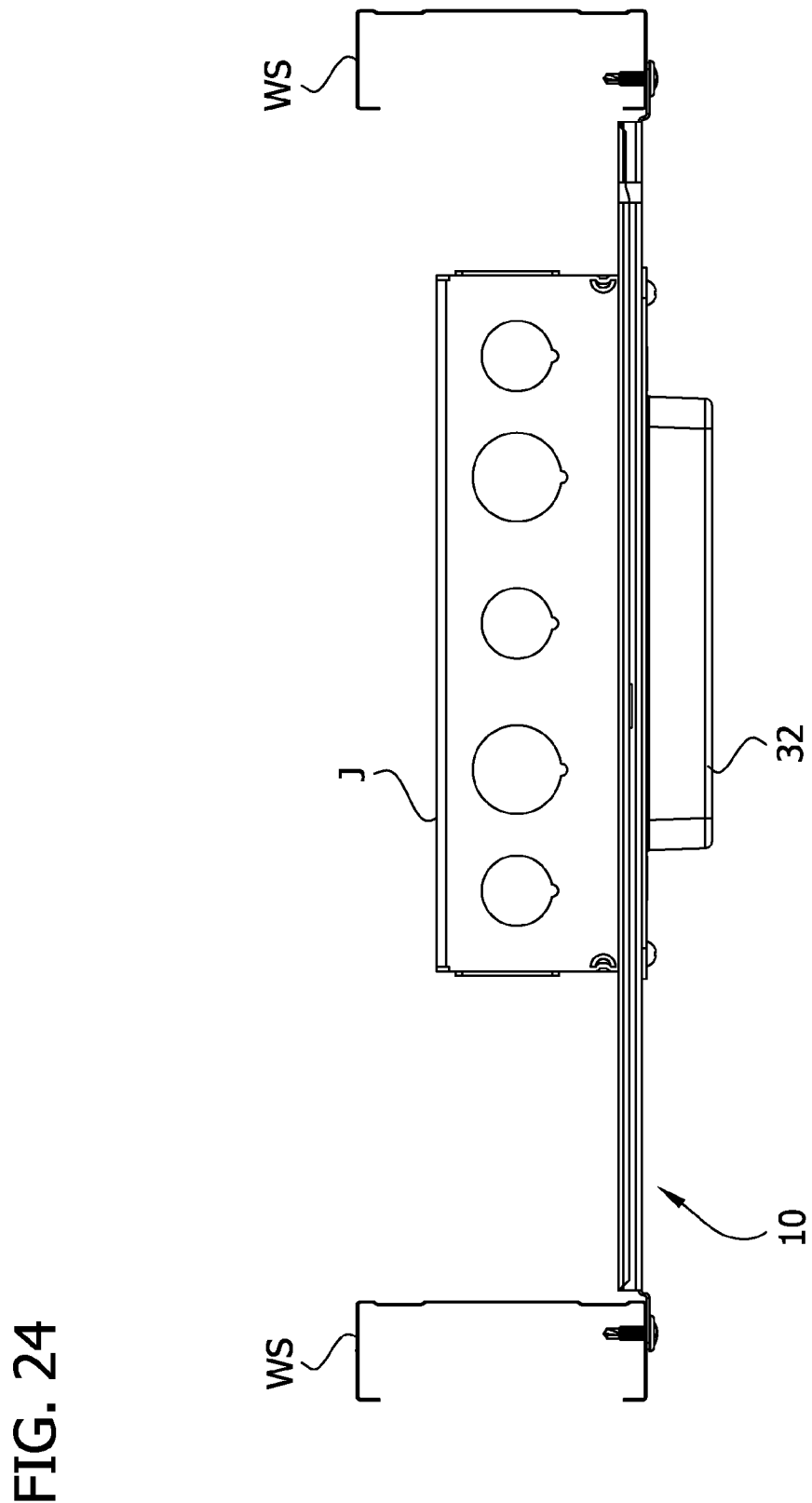
FIG. 24 is a top plan of FIG. 23.
Figure 25:
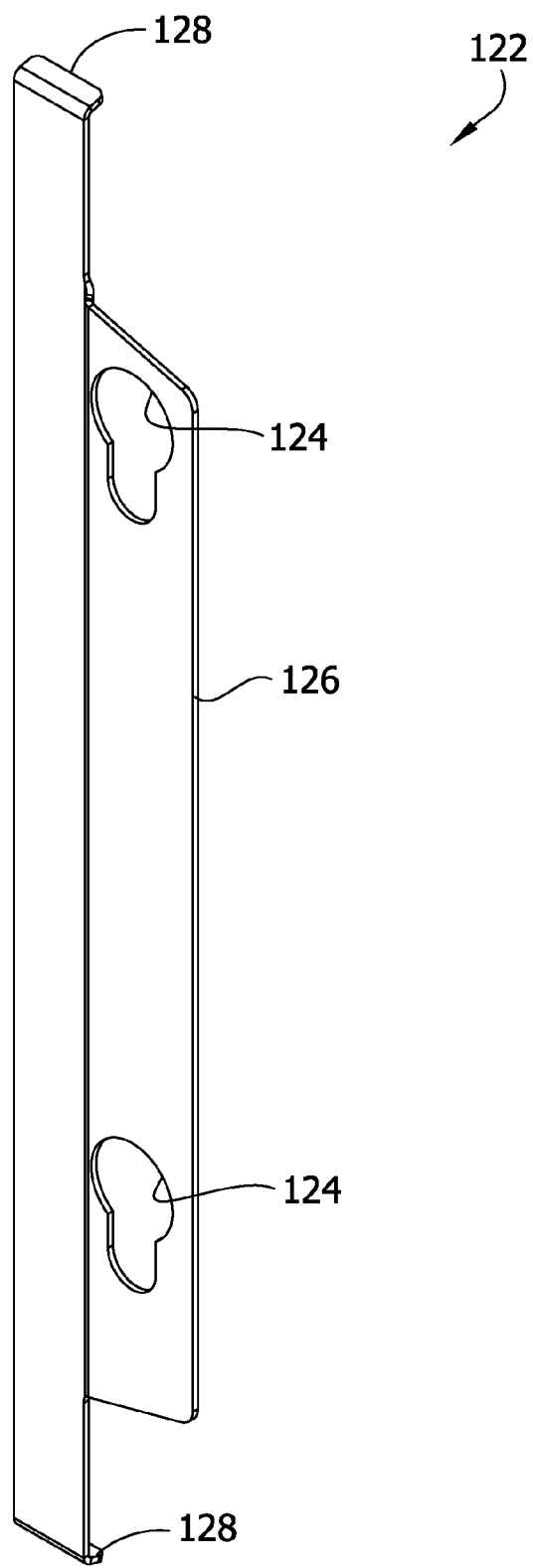
FIG. 25 is a perspective of a multi-gang alignment plate for use with the mounting bracket.
Figure 26:
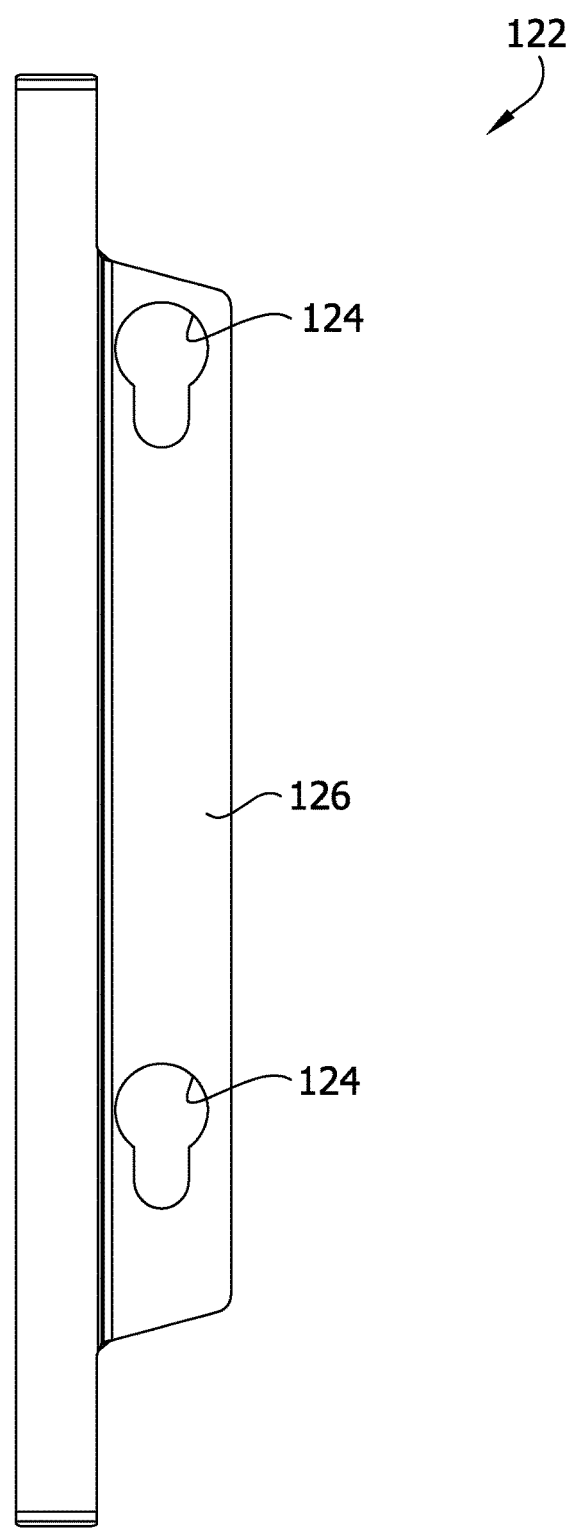
FIG. 26 is a front elevation of the multi-gang alignment plate of FIG. 25.
Figure 27:
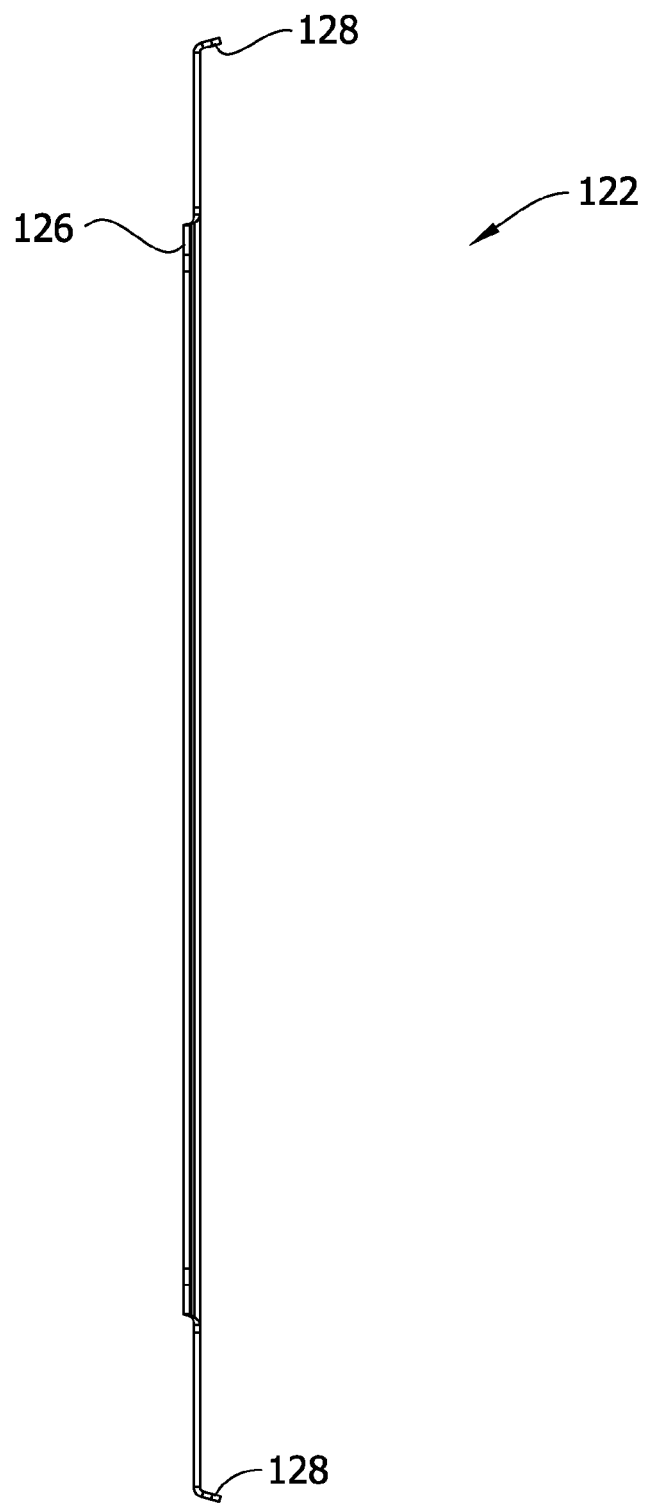
FIG. 27 is a side elevation of the multi-gang alignment plate of FIG. 25.
Figure 28:
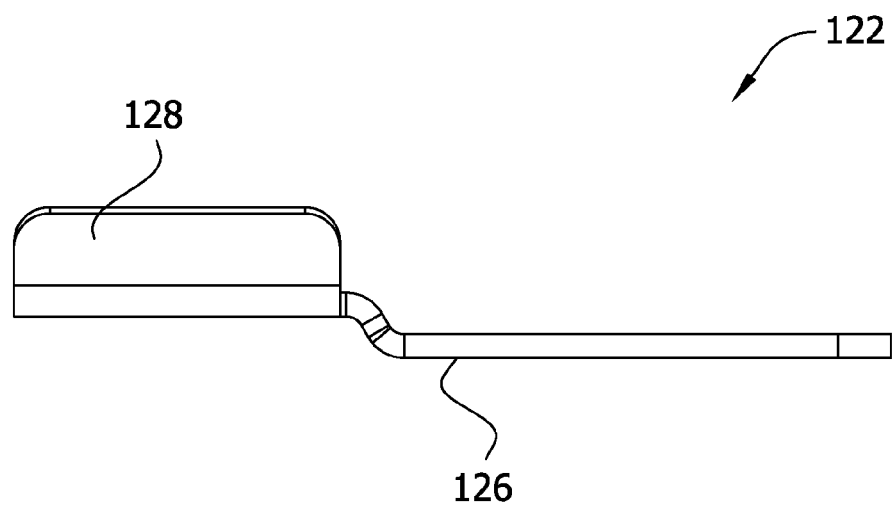
FIG. 28 is a top plan of the multi-gang alignment plate of FIG. 25.
Figure 29:
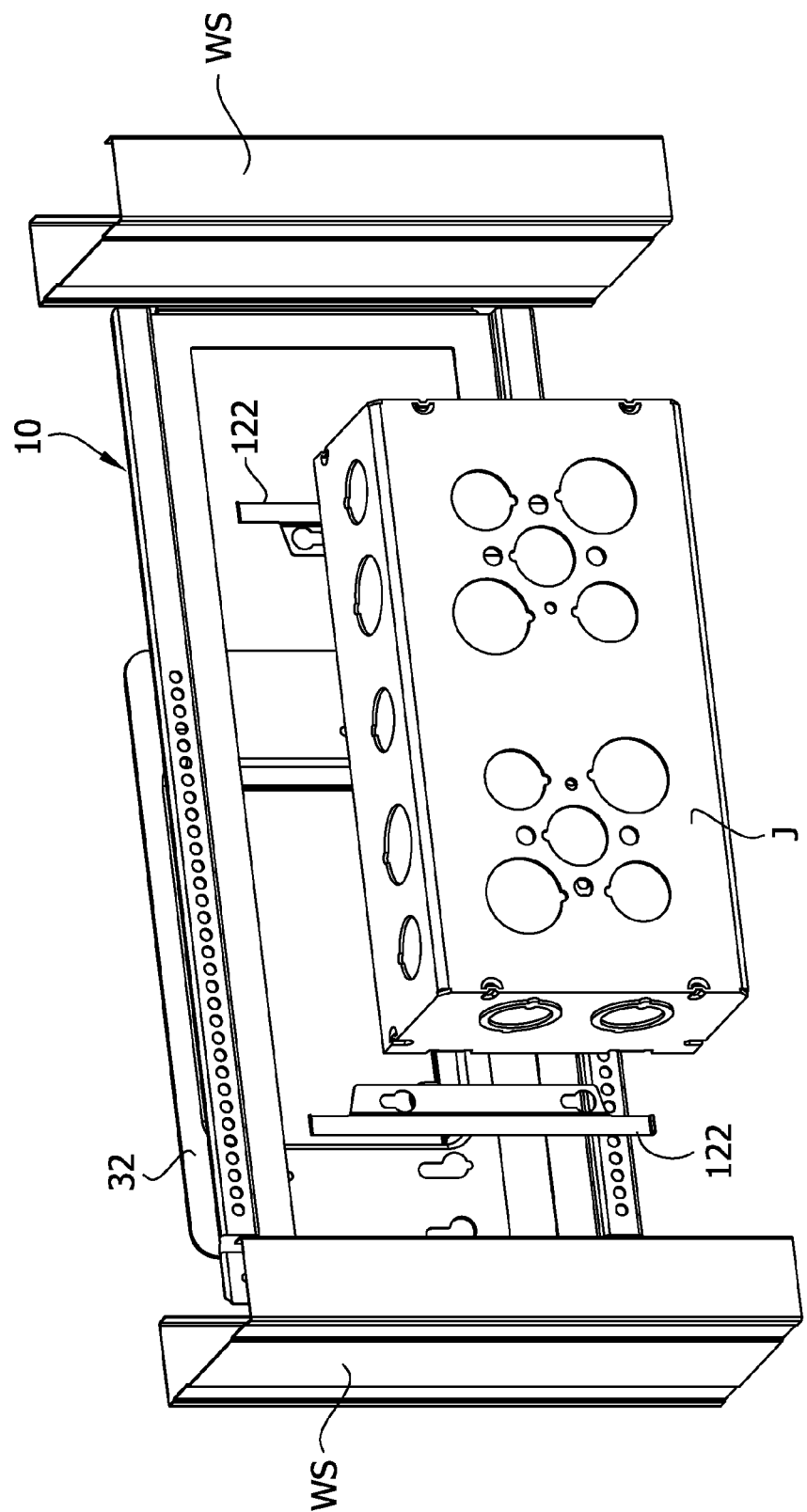
FIG. 29 is a separated rear perspective of the mounting bracket, two multi-gang alignment plates, multi-gang junction box, and box cover plate.
Figure 30:
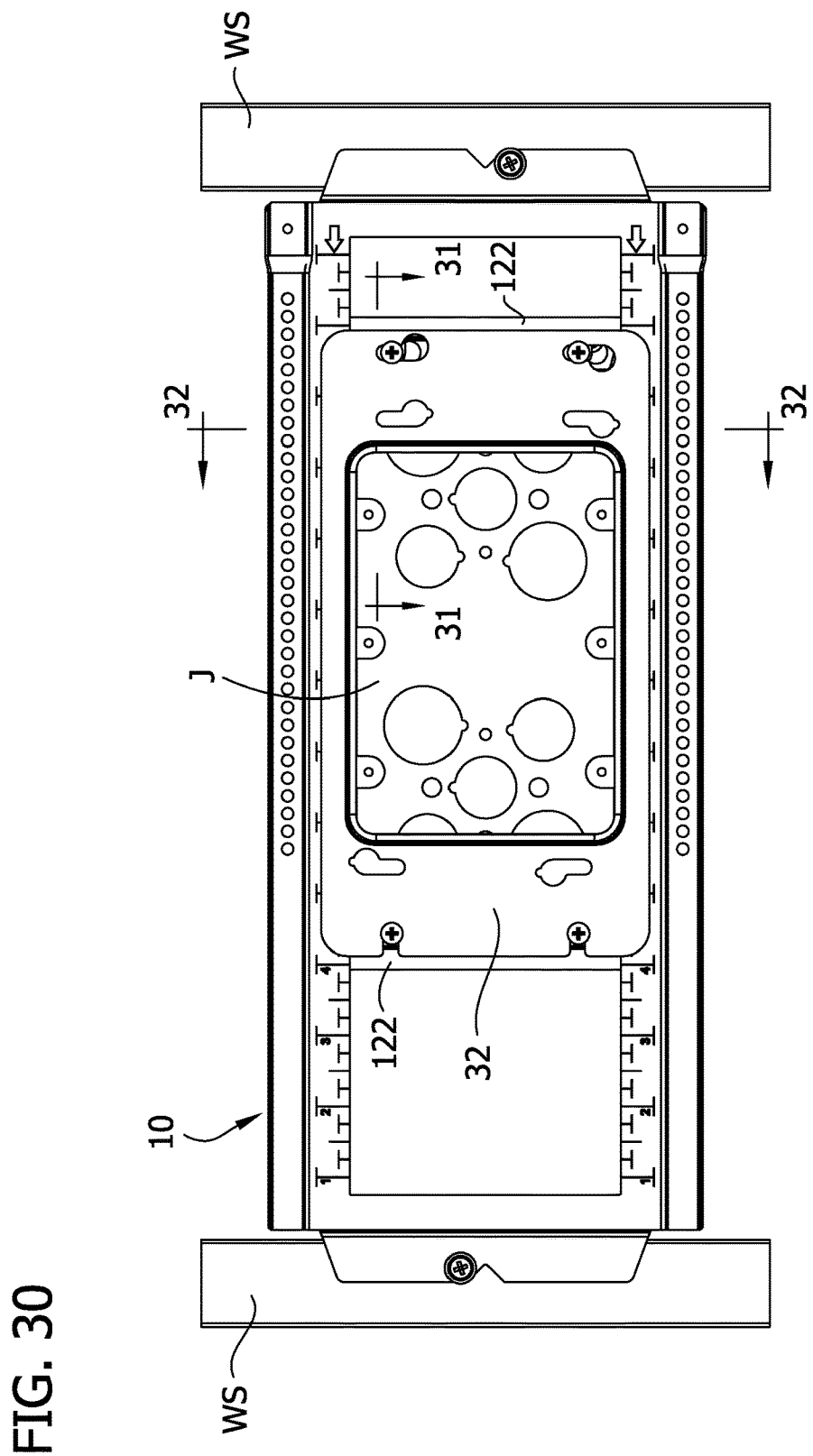
FIG. 30 is a front plan of the mounting bracket attached to two wall studs with a multi-gang junction box, two multi-gang alignment plates, and a multi-gang box cover plate mounted on the mounting bracket.
Figure 31:
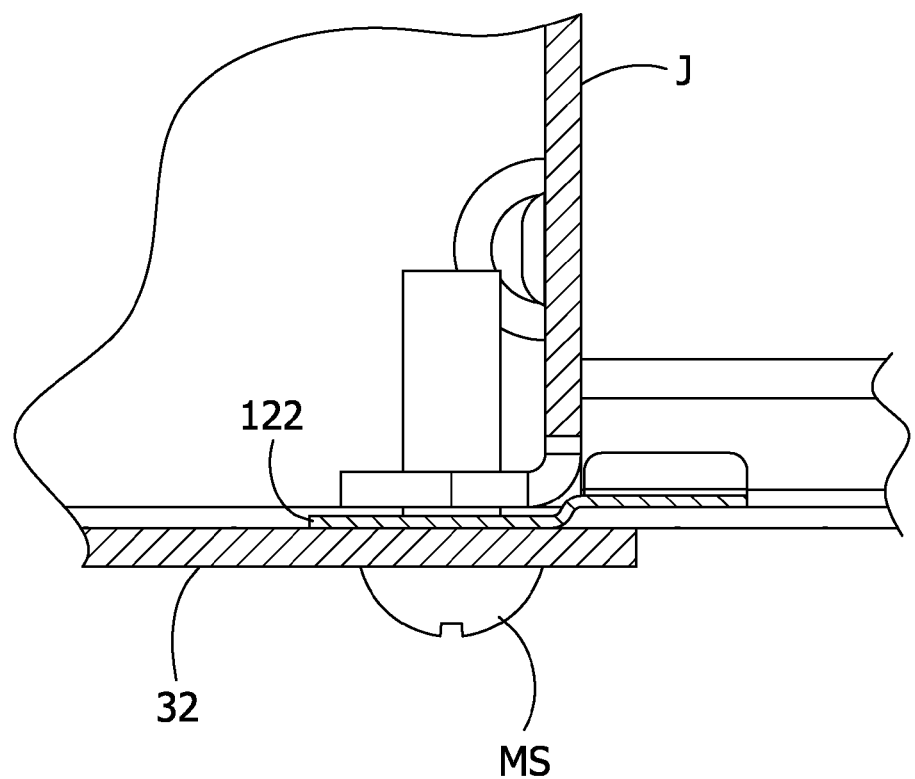
FIG. 31 is an enlarged partial section taken along line 31-31 of FIG. 30.
Figure 32:
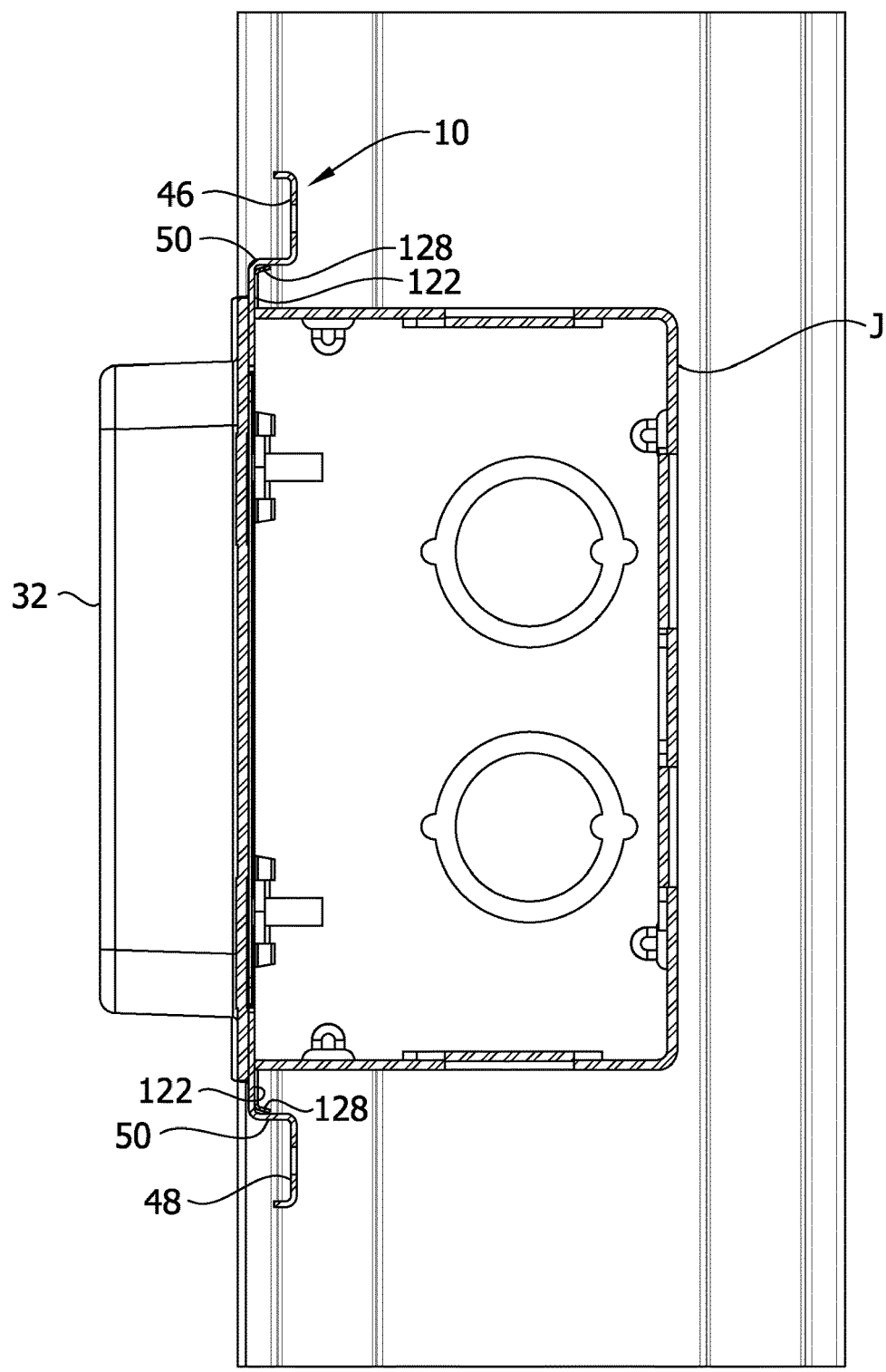
FIG. 32 is a section taken along line 32-32 of FIG. 30.
Figure 33:
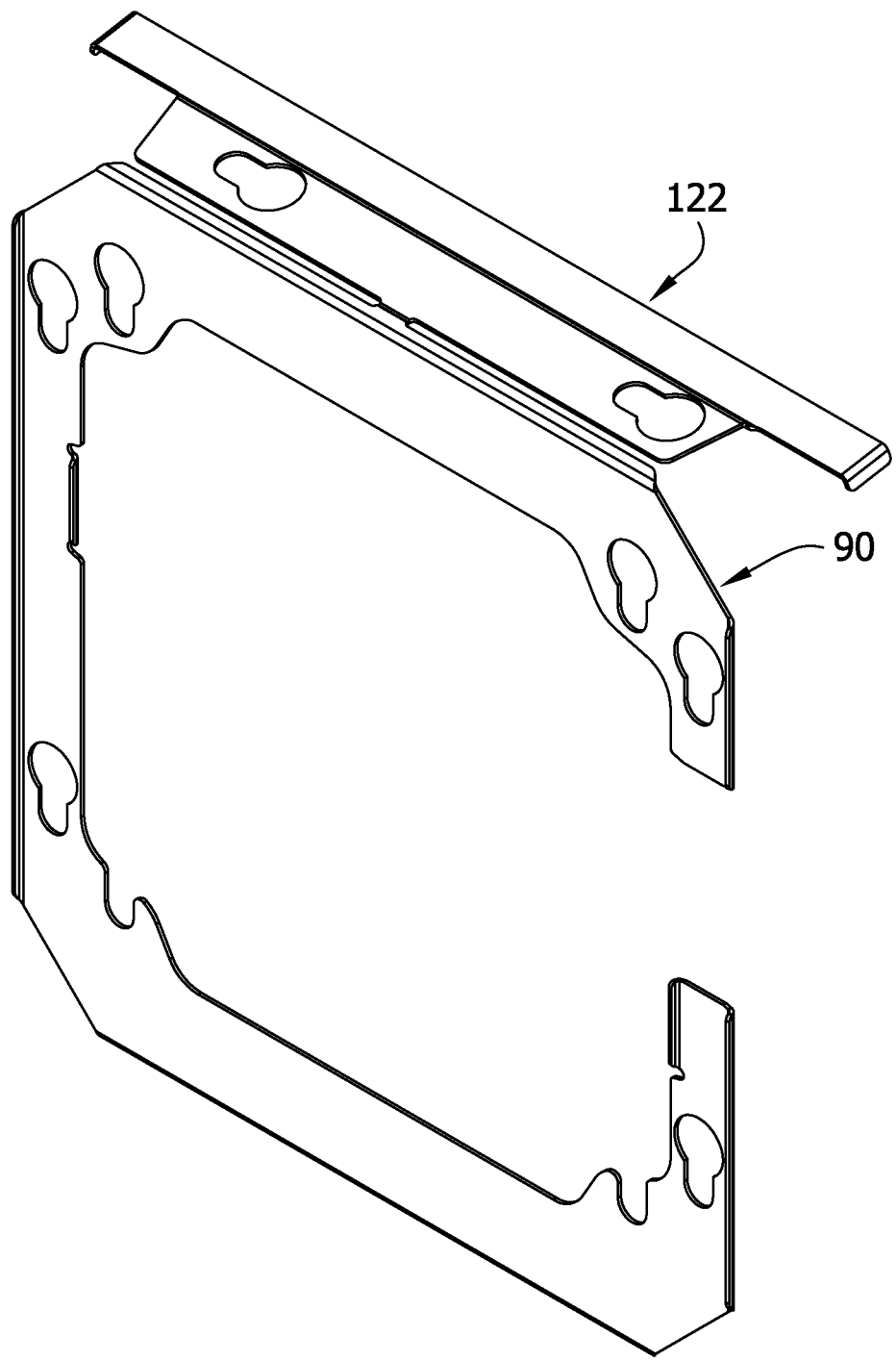
FIG. 33 is a perspective of a combination alignment plate and multi-gang alignment plate.
Figure 34:
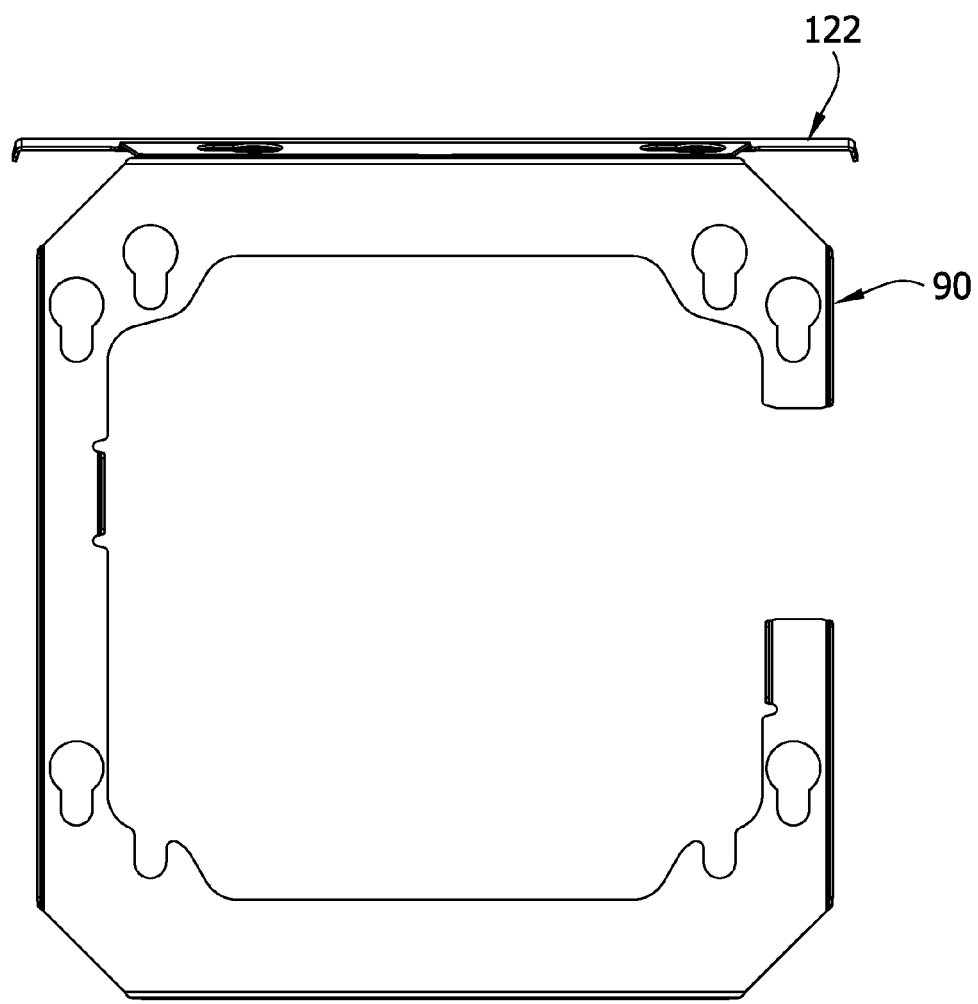
FIG. 34 is a front elevation of the combination plate of FIG. 33.
Figure 35:
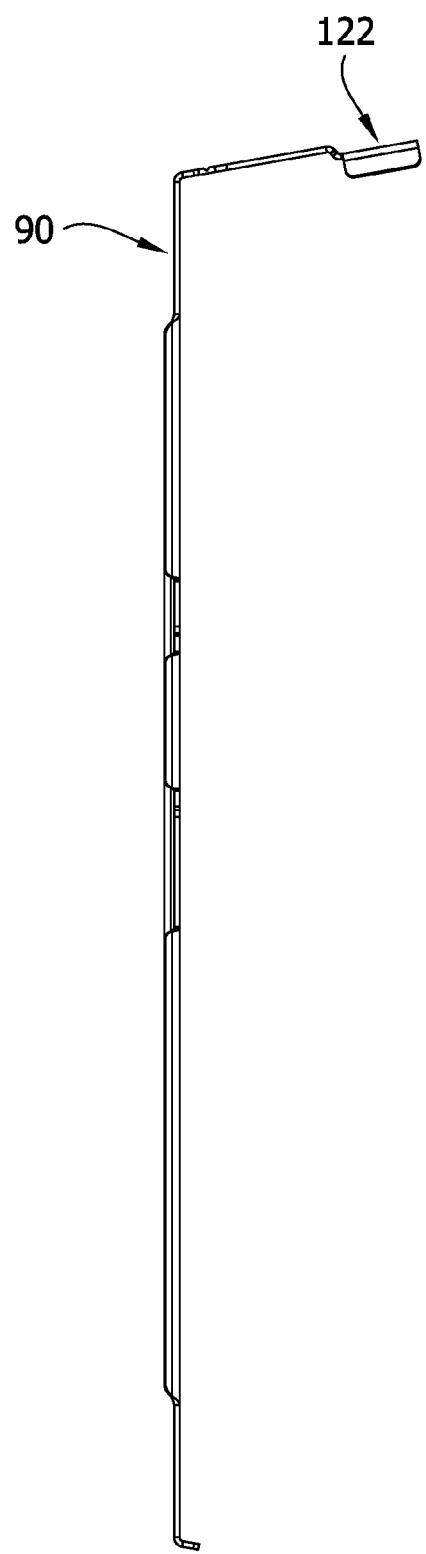
FIG. 35 is a side elevation of the combination plate of FIG. 33.
Figure 36:
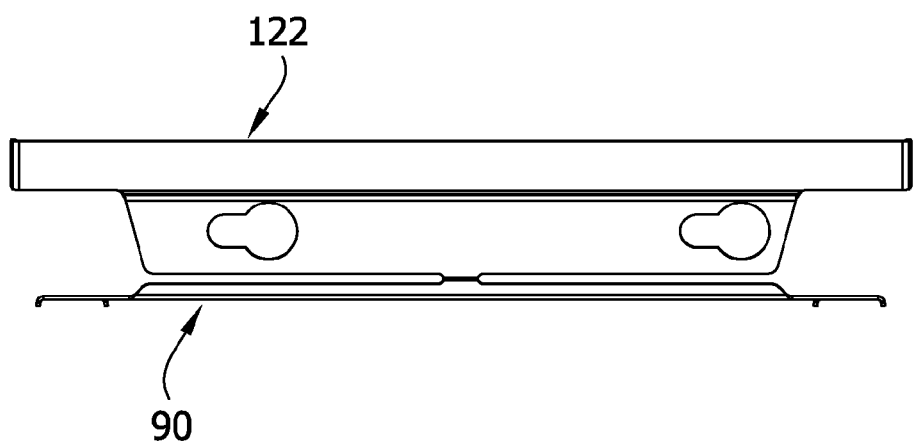
FIG. 36 is a top plan of the combination plate of FIG. 33.
Figure 37:
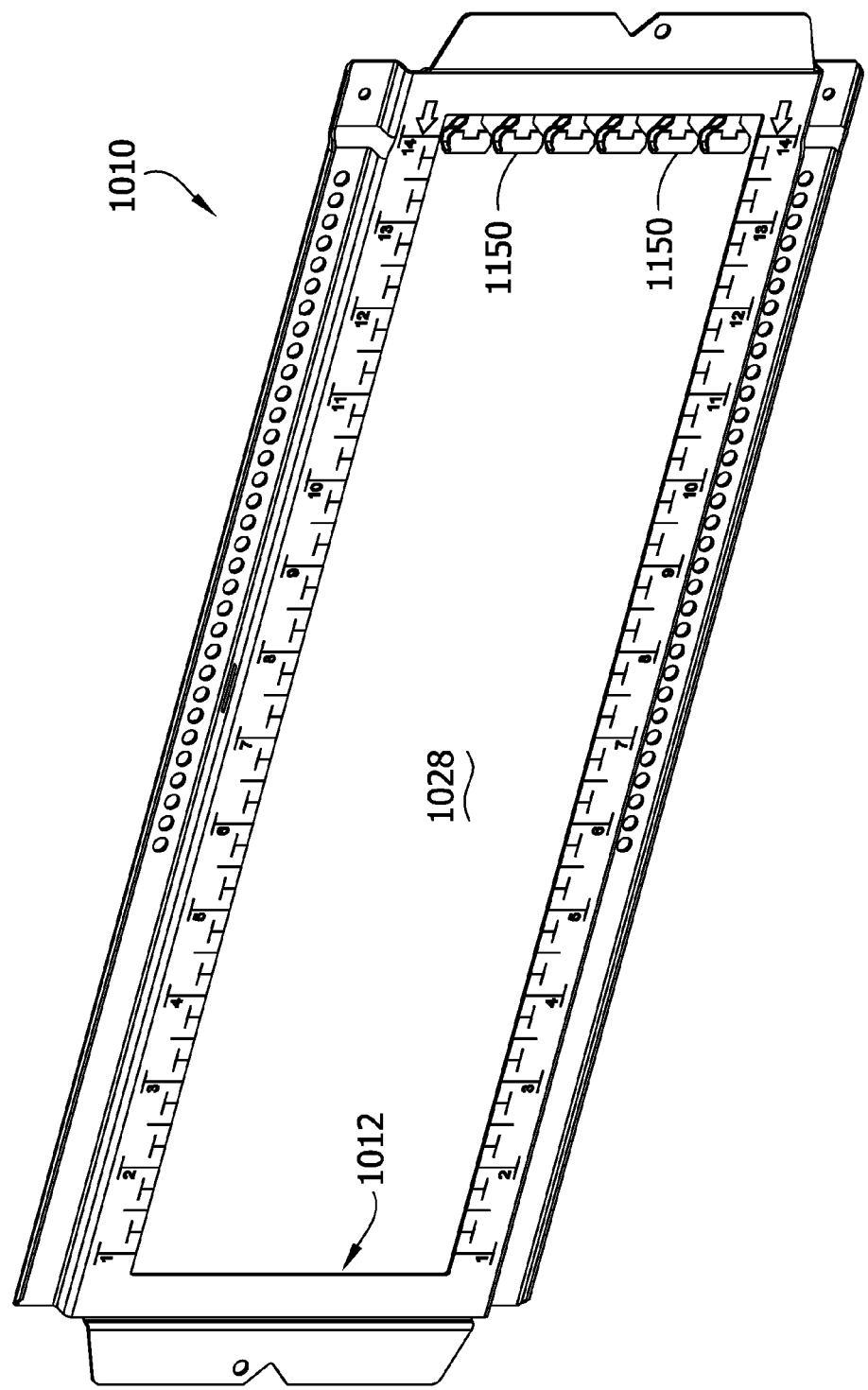
FIG. 37 is a perspective of a second embodiment of a mounting bracket for a junction box, the mounting bracket having detachable filler clips.
Figure 38:
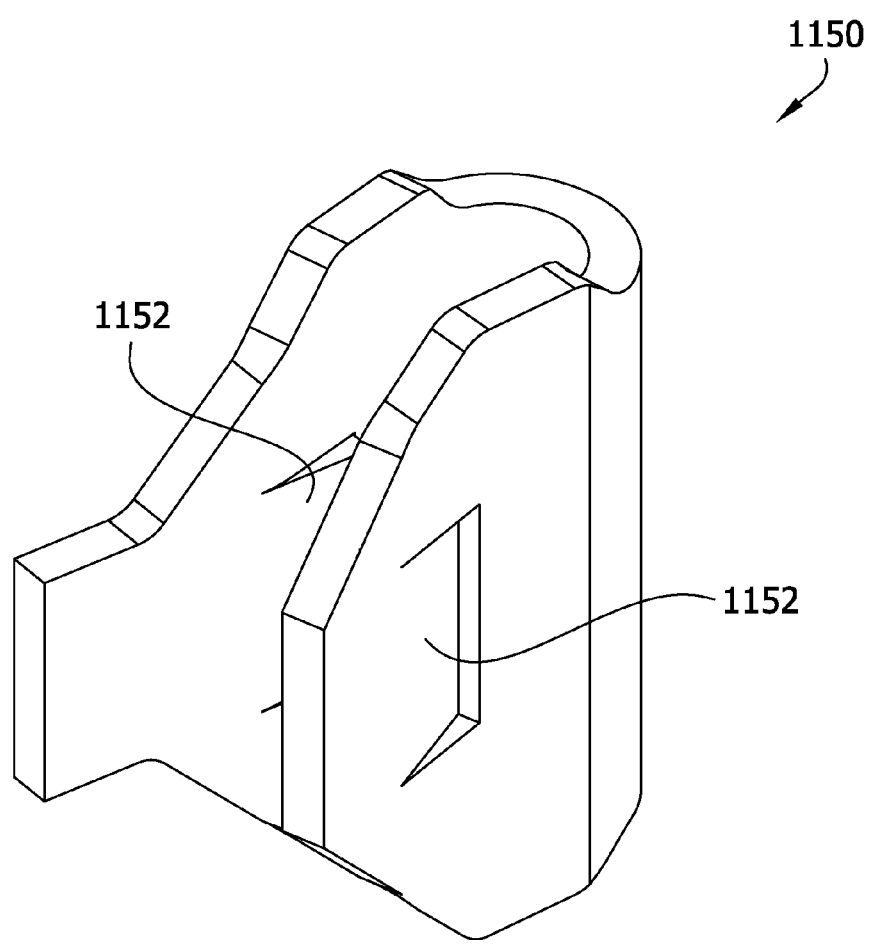
FIG. 38 is a perspective of a filler clip of the mounting bracket.
Figure 39:
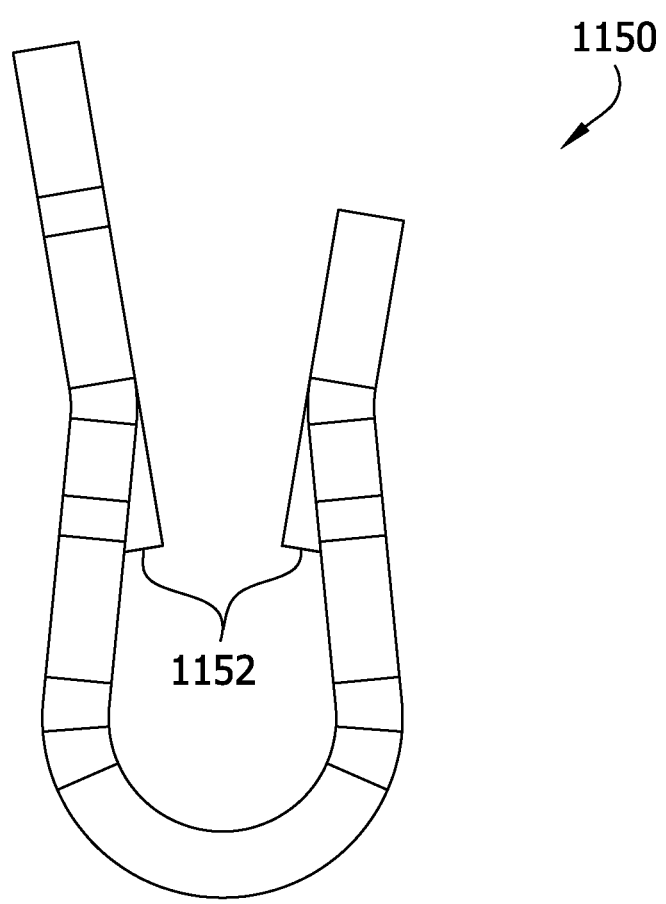
FIG. 39 is a side elevation of the filler clip.
Figure 40:
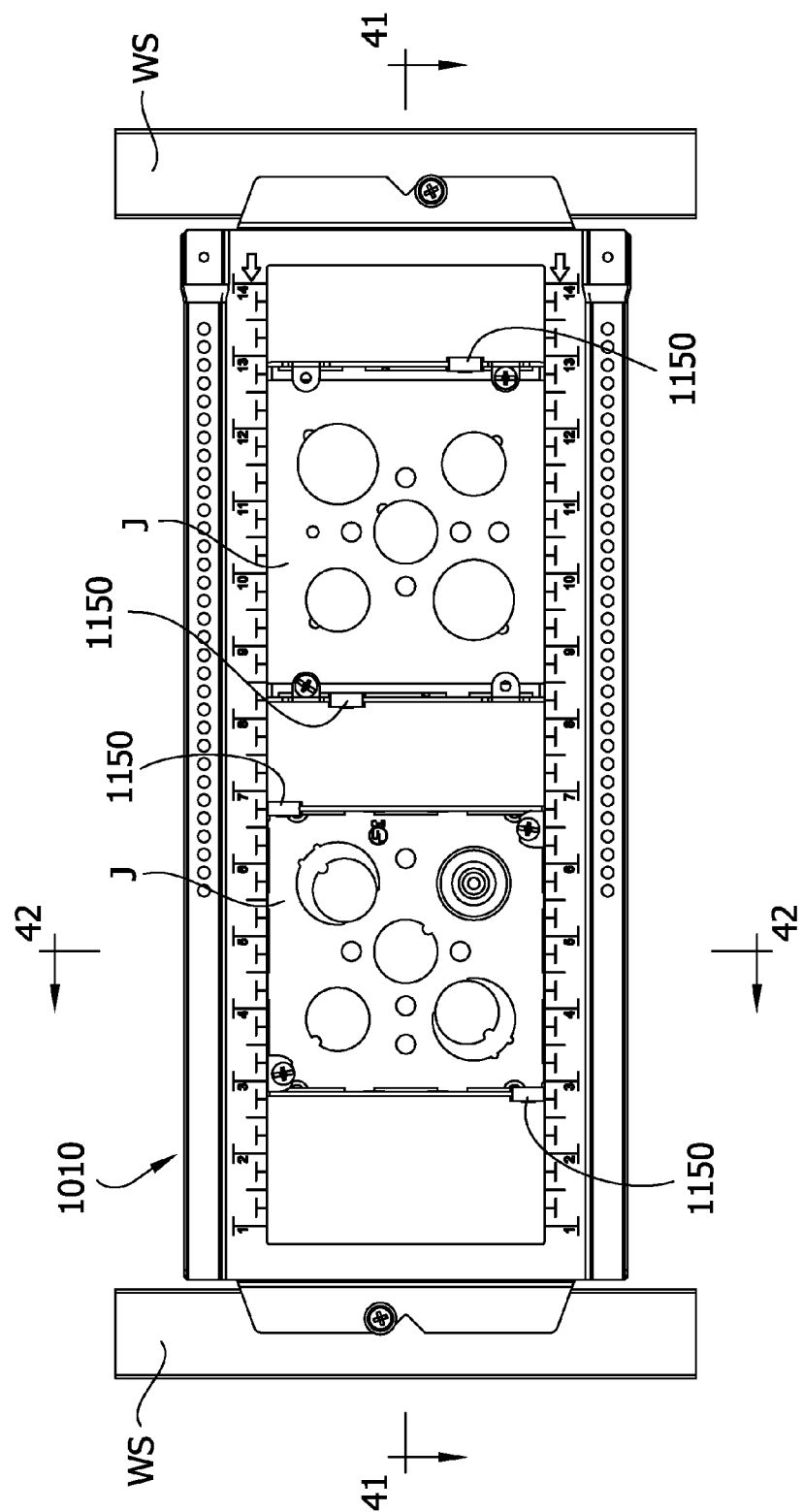
FIG. 40 is a front plan of the mounting bracket attached to two wall studs with a junction box with the filler clips thereon mounted on the mounting bracket.
Figure 41:
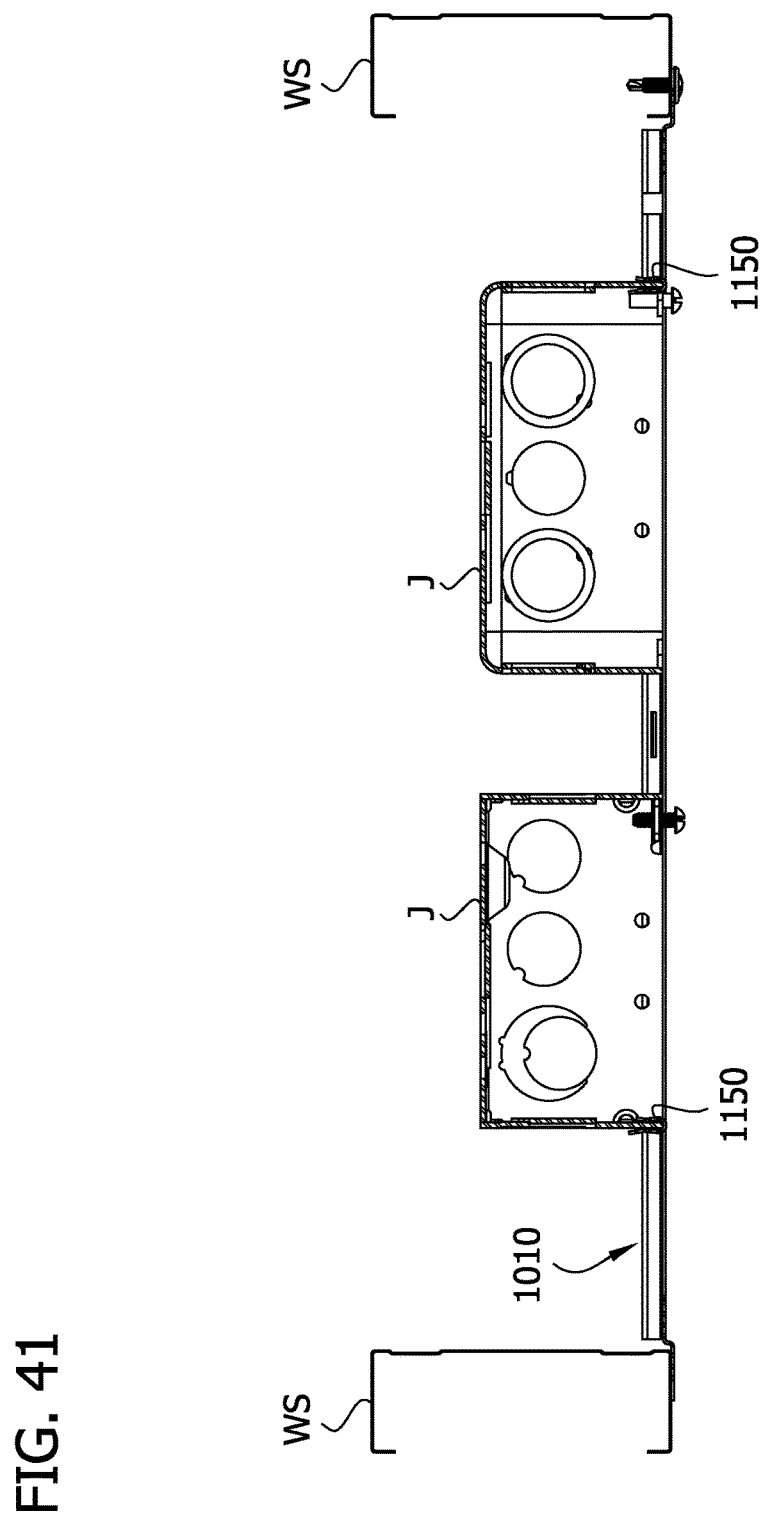
FIG. 41 is a section taken along line 41-41 of FIG. 40.
Figure 42:
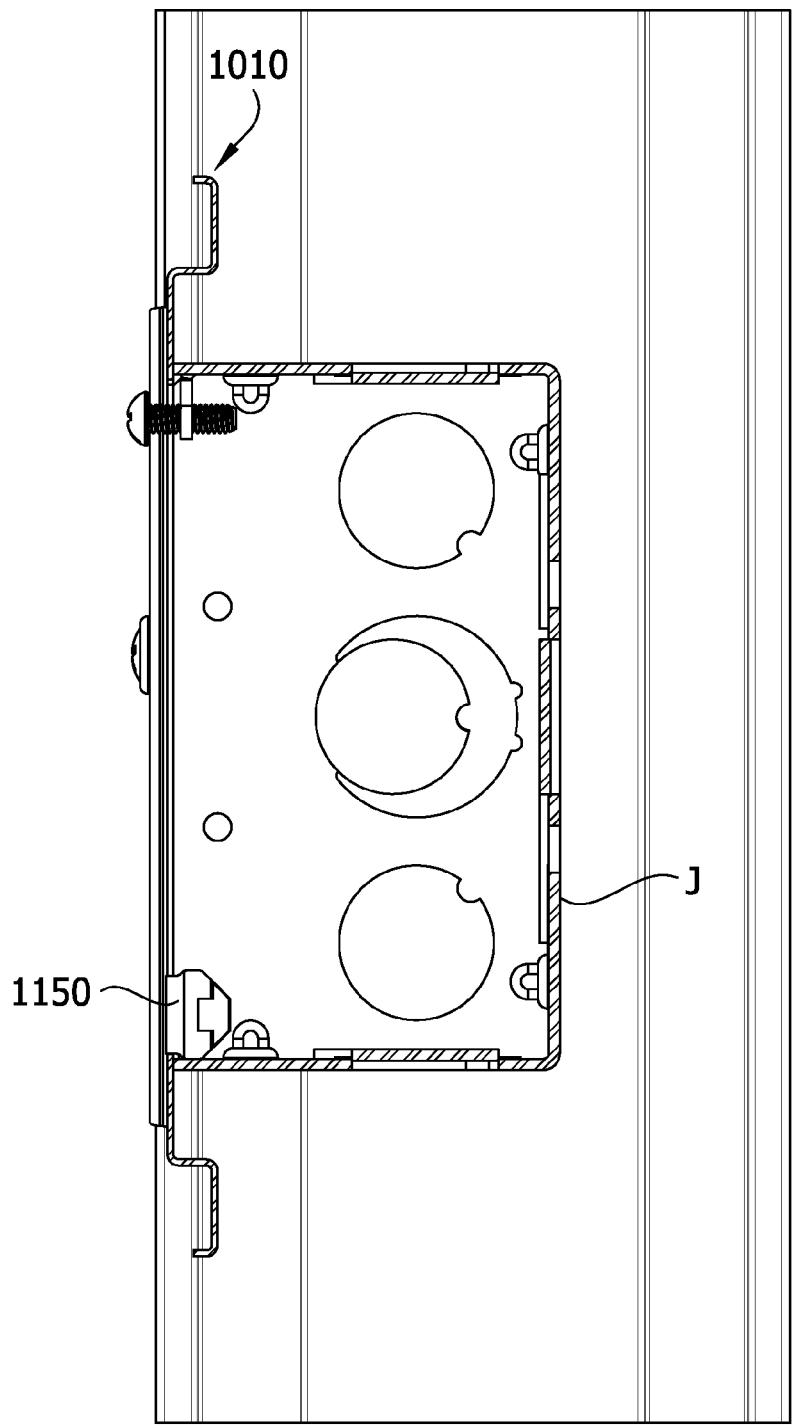
FIG. 42 is a section taken along line 42-42 of FIG. 40.

The face plate 12 also includes stud mounting flanges 72. The stud mounting flanges 72 extend laterally outward from the left and right edge margins 20, 22 of the main body 14. In general, these stud mounting flanges 72 are used to secure the mounting bracket 10 to the wall studs WS using suitable fasteners F (e.g., standard self-tapping sheet metal screws), as shown in FIGS. 7 and 8, for example. The stud mounting flanges 72 are configured to permit two brackets 10 to be mounted to a single stud WS without overlap of the stud mounting flanges.

In an initial configuration, the face plate 12 has an initial length L1 between the left and right edge margins 20, 22. The length L1 corresponds to a standard distance between wall studs WS (e.g., 16" or 24"). In the initial configuration, the bracket 10 can be attached to two studs WS spaced a distance D1 generally corresponding to the length L1 of the face plate 12, as seen in FIGS. 7 and 8. The stud mounting flanges 72 are positioned on a front mounting face F1 of each stud WS and fastened to the stud with fasteners F to attach the bracket 10 to each stud.

If the distance D1 between the two studs WS is less than the length L1 of the face plate 12, the length L1 of the face plate 12 can be adjusted to fit between the studs. In the illustrated embodiment, the bracket 10 can be cut (e.g., field cut) to fit between different stud distances. In order to decrease the length L1 of the face plate 12 to an adjusted length, the bracket 10 is cut at a first cutting location 74 corresponding to the transition portion 66 of the channels 46, 48 to remove a removable end portion 82 of the bracket 10 including the enlarged end portions 64 of the respective channel members 46, 48 from the remainder of the bracket. The removable end portion 82 can be removed from the remainder of the bracket 10 in other ways besides cutting, such as by breaking off the removable end portion. The first cutting location 74 can be marked with indicia, such as arrows 76 as illustrated. The bracket 10 is also cut at a second cutting location 78 corresponding to a distance D1 between the studs WS. In particular, the bracket 10 is cut at the second cutting location 78 at the ruler graduations 34 marking the measured distance D1. In the example illustrated in FIGS. 9-13, the distance D1 between the studs WS is 10¼ inches. Thus, the bracket 10 is cut at the first cutting location 74 as indicated by the arrows 76, and cut at the second cutting location 78 at the ruler graduations 34 marking 10¼ inches.

The material between the first and second cutting locations 74, 78 is discarded, leaving a main portion 80 of the bracket 10 and the removable end portion 82 including the enlarged end portions 64 of the respective channel members 46, 48. The removable end portion 82 of the bracket 10 is then nested with the main portion 80. Because the widths W1 of the enlarged end portions 64 of the respective channel members 46, 48 are greater than widths W2 of the remainder of the channel members, the channel members of the main portion 80 fit within the enlarged end portions 64 of the removable end portion 82. Accordingly, in the illustrated embodiment, the enlarged end portions 64 of the respective channel members 46, 48 nest with and lie behind the remainder of the channel members and the stud mounting flange 72 on the removable end portion 82 extends laterally outward from the main portion 80 of the bracket. The nested main portion 80 and removable end portion 82 are attached by fasteners 84 (e.g., standard self-tapping sheet metal screws) extending through the channel rear walls 52 of the main portion and threaded into the pilot holes 68 of the enlarged end portions 64 of the channel members 46, 48 of the removable end portion 82. If the rear walls 52 of the channel members 46, 48 include clearance holes 60, the pilot hole 68 of each enlarged end portion 64 is aligned with one of the clearance holes 60. Once the bracket 10 is configured to the adjusted length to fit between the two studs WS, the stud mounting flanges 72 are positioned on a front mounting face F1 of each stud and fastened to the stud with fasteners F to attach the bracket to each stud.

With the bracket 10 attached to and extending between two studs WS, one or more junction boxes J can be mounted on the bracket. Each junction box J is mounted against the rear face 26 of the main body 14. A box cover plate 32 (e.g., a plaster or mud ring or other ring structure) is mounted against the front face 24 of the main body 14. As is known in the art, mounting screws MS on the junction box J are received in slots in the box plate 32 and tightened to connect the box plate and the junction box to each other and to the mounting bracket 10. An electrical or communications device (not shown) may also be secured in the junction box J.

The ruler graduations 34 can be used to align and position the one or more junction boxes J and corresponding box plates 32 at desired locations on the bracket 10. The hash marks 40 can be used to position the junction box J at a desired location between the studs WS. The horizontal registration lines 42 can be used as a reference to align the box plate 32, thereby aligning the junction box J. Typically, a box plate 32 having a height in the range of 4¹⁄₁₆ inches to 4¾ inches is used in conjunction with a 4×4 junction box J, and a box plate having a height in the range of 4¾ inches to 4⅞ inches is used in conjunction with a 4¹¹⁄₁₆×4¹¹⁄₁₆ junction box. The horizontal registration lines 42 can correspond to these standard box plate sizes. For example, the bracket 10 can include two sets of horizontal registrations lines 42 having lines positioned above and below the central opening 28, one spaced a distance in a range of 4¹⁄₁₆ inches to 4¾ inches, and one spaced a distance in a range of 4¾ inches to 4⅞ inches. In the illustrated embodiment, the horizontal registration lines 42 on the ¼ inch hash marks 40 are spaced a distance of 4⅛ inches, and the horizontal registration lines on the 1 inch hash marks are spaced a distance of 4¾ inches. Other configurations are within the scope of the present invention. The box plate 32 can be aligned with the horizontal registration lines 42 above the central opening 28, aligned with the horizontal registration lines below the central opening, or can be aligned with neither if the horizontal registration lines are used merely as a reference for alignment.

The bracket 10 can be configured to automatically center and align a 5 in×5 in junction box J. Specifically, the distance D2 between the first sidewalls 50 of the upper and lower channel members 46, 48 generally corresponds to the height of the 5×5 junction box J so that the 5×5 junction box can be received and centered between the first sidewalls at the rear face 26. Similarly, the bracket 10 can be configured to automatically center and align a box plate 32 having a rearward extending flange (e.g., the box plate described in U.S. Pat. No. 8,575,484). The height of the central opening 28 of the bracket 10 can generally correspond to the height of the rearward extending flange of the box plate 32 so that the box plate is received and aligned in the central opening at the front face 24, to thereby align and center the box to which the box plate is attached. If a different size junction box J (e.g., 4×4 or 4¹¹⁄₁₆×4¹¹⁄₁₆) or different type box plate 32 (e.g., a standard plaster ring with forward extending collar) is attached to the bracket 10, they can be aligned and centered by aligning the junction box and box plate with the ruler graduations and horizontal registration lines as described above, or optionally by using a separate alignment plate 90.

As seen in FIGS. 14-22, the illustrated alignment plate 90 is a unitary, one piece construction. The alignment plate 90 is generally rectangular and has opposite upper and lower edge margins 92, 94, opposite left and right edge margins 96, 98, a front face 100, a rear face 102, and a large, generally rectangular, central opening 104 defined by opening edges 106. The alignment plate 90 includes openings 108 configured for attachment to mounting screws MS on the junction box J. The alignment plate 90 includes openings 108 configured for connection to a 4×4 junction box and openings configured for connection to a 4¹¹⁄₁₆×4¹¹⁄₁₆ junction box. The alignment plate 90 is configured for mounting adjacent the rear face 26 of the main body 14 of the bracket 10, and has a height extending between the upper and lower edge margins 92, 94 that generally corresponds to the distance D2 between the first sidewalls 50 of the upper and lower channels 46, 48 to permit the alignment plate to be centered and aligned on the bracket 10.

The alignment plate 90 includes an alignment structure configured to align the alignment plate, the junction box J, and the box plate 32 on the bracket. In the illustrated embodiment, the alignment plate 90 includes a first set of flanges 114 (e.g., upper and lower flanges) configured to extend rearward away from the central opening 28 of the bracket 10 to align the alignment plate, the junction box J, and the box plate 32 on the bracket. The first set of flanges 114 extend rearward from the upper and lower edge margins 92, 94 of the alignment plate 90. The flanges 114 are configured to engage the first sidewalls 50 of the upper and lower channel members 46, 48 of the bracket 10 so that the alignment plate 90 can be received and centered between the first sidewalls at the rear face 26. In use, the alignment plate 90 is attached to the junction box J, and then the alignment plate and junction box assembly are mounted on the bracket 10.

The alignment plate 90 optionally includes at least one projection extending forward to reduce a gap between the alignment plate (and therefore the junction box J) and the box plate 32 to meet local electrical code standards. The at least one projection can also stiffen the alignment plate 90 to provide additional structural rigidity. In the illustrated embodiment, the alignment plate 90 includes a second set of flanges 116 configured to reduce the gap for a 4¹¹⁄₁₆×4¹¹⁄₁₆ junction box, and a third set of flanges 118 configured to reduce the gap for a 4×4 junction box. Other configurations are within the scope of the present invention, such as ribs or other projections extending forward to reduce the gap, or other configurations of flanges. Alternatively, the alignment plate need not have any projection extending forward to reduce the gap. The second set of flanges 116 extend forward from the left and right edge margins 96, 98 of the alignment plate 90. The second set of flanges 116 is configured to extend into the central opening 28 of the bracket 10 when installed to reduce the gap between the front face 100 of the alignment plate 90 and a rear face of the box plate 32 within the central opening of the bracket. The flanges 116 are sized and dimensioned to reduce the gap to comply with local electrical codes when a 4¹¹⁄₁₆×4¹¹⁄₁₆ junction box is mounted on the bracket 10. The third set of flanges 118 extend forward from the opening edges 106 of the alignment plate 90. The third set of flanges 118 is configured to extend into the central opening 28 of the bracket 10 when installed to reduce the gap between the front face 100 of the alignment plate 90 and a rear face of the box plate 32 within the central opening of the bracket. The flanges 118 are sized and dimensioned to reduce the gap to comply with local electrical codes when a 4×4 junction box is mounted on the bracket 10.

The alignment plate 90 can include a cutout such that the generally rectangular shape is open (e.g., C-shaped), as illustrated, although other configurations (e.g., a closed rectangular configuration) are within the scope of the present invention. The C-shape uses less material than a closed rectangle and permits two alignment plates 90 to be formed in nested configuration (see FIG. 18) to reduce material and production costs.

As seen in FIGS. 23-32, the bracket 10 can also be used to mount multi-gang junction boxes J, which are known in the art. To align a multi-gang junction box J in the bracket 10, a multi-gang alignment plate 122 can be used. The multi-gang alignment plate 122 is configured for mounting adjacent the rear face 26 of the main body 14, and has a height that generally corresponds to the distance D2 between the first sidewalls 50 of the upper and lower channels 46, 48 to permit the multi-gang alignment plate to be centered and aligned on the bracket 10. The alignment plate 122 includes openings 124 configured for attachment to mounting screws MS on the multi-gang junction box J. The openings 124 are positioned on a flange 126. The multi-gang alignment plate 122 includes a set of flanges 128 at the top and bottom thereof configured to extend rearward away from the central opening 28 of the bracket 10 to engage the first sidewalls 50 to align the junction box J, as described above with reference to the alignment plate 90. In use, one multi-gang alignment plate 122 is positioned at each end of the multi-gang junction box J and is attached thereto with mounting screws MS. In one embodiment, the alignment plate 90 and the multi-gang alignment plate 122 can be formed together (see FIGS. 33-36) to permit use of either or both alignment plates as required by the specific application.

FIGS. 37-42 illustrate a second embodiment of an adjustable mounting bracket, generally indicated at 1010. Corresponding reference numbers are used to refer to corresponding elements. Where elements are substantially similar to the embodiment described above, they will not be described in detail again below. As described above with reference to the previous embodiment, the mounting bracket 1010 is configured to be adjustable depending on the distance between studs WS, and includes ruler graduations and horizontal registration lines. The mounting bracket 1010 also includes filler clips 1150 detachably connected to the face plate 1012 adjacent the central opening 1028. The filler clips 1150 are generally U-shaped and include catches 1152. The filler clips 1150 are configured to be attached to or clipped onto the junction box J to align the junction box in the bracket 10. For example, the filler clip(s) 1150 can be detached as needed and clipped onto the junction box J adjacent the mounting screw flange. The junction box J can then be mounted on the bracket 10 and aligned such that the filler clip(s) 1150 extend through the central opening 1028 and abut edges of the central opening to align the junction box J in the opening. The filler clips 1150 also reduce the gap between the junction box and the box plate in the central opening 1028 in accordance with local electrical codes.

The mounting bracket 10 can be sold and shipped to customers separately or as part of an assembly, such as a pre-assembled electrical unit, or as part of a kit. In one embodiment, a mounting bracket assembly includes the mounting bracket 10 as described above, one or more junction boxes J for attachment to the mounting bracket, and one or more box plates 32 for attachment to the mounting bracket. The junction box(es) J and box plate(s) 32 can be attached to the mounting bracket 10 as-sold. Alternatively, the mounting bracket 10, junction box(es) J, and box plate(s) 32 can be sold together as a kit for assembly by the user. In another embodiment, a mounting bracket assembly includes the mounting bracket 10, junction box J, box plate 32, and an alignment plate 90 (or pair of alignment plates 122, if applicable), sold assembled or disassembled. In yet another embodiment, a mounting bracket assembly includes the mounting bracket 10 and an alignment plate 90 (or pair of alignment plates 122). Other configurations and assemblies are within the scope of the present invention.

The mounting brackets as described above are versatile and permit a user to use the bracket with various size junction boxes and various distances between adjacent wall studs. The mounting brackets as described eliminate the need for different lengths of mounting bracket based on wall stud distance or different size mounting brackets based on junction box size. In addition, the bracket includes alignment features for ensuring the junction box and box cover plate are properly aligned in the bracket.

Having described embodiments of the invention in detail, it will be apparent that modifications and variations are possible without departing from the scope of the invention defined in the appended claims.

When introducing elements of the present invention or the illustrated embodiments thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A mounting bracket for a junction box comprising:
   a face plate having opposite upper and lower edge margins, opposite left and right edge margins, and a central opening;
   an upper channel extending upwardly from the upper edge margin; and
   a lower channel extending downwardly from the lower edge margin,
   wherein each of the upper and lower channels includes an enlarged end portion at one end thereof, each enlarged end portion having a width greater than a width of a remainder of the respective channel,
   wherein each of the enlarged end portions includes a first sidewall extending rearward from the corresponding one of the upper and lower edge margins, a rear wall extending from the first sidewall, and a second side wall extending forward from an upper end of the rear wall and opposing the first side wall to define an open front of the enlarged end portion,
   wherein the enlarged end portions of the upper and lower channels are configured to be removed from the remainder of the respective upper and lower channels to form removed enlarged end portions,
   wherein the enlarged end portions of the upper and lower channels are sized and shaped such that portions of the remainders of the upper and lower channels are capable of entering the removed enlarged end portions of the corresponding upper and lower channels through the open front of the upper and lower channels to nest the upper and lower channels in the removed enlarged end portions,
   wherein each of the upper and lower channels includes a transition portion extending between and connecting the enlarged end portion and the remainder of the respective upper and lower channels, the transition portion gradually increasing in width toward the enlarged end portion.

2. The mounting bracket of claim 1, wherein the rear wall of each enlarged portion includes a pilot hole.

3. The mounting bracket of claim 2, wherein the rear wall of each of the upper and lower channels includes clearance holes at spaced intervals along a length of the respective channel, wherein the clearance holes have diameters greater than the diameters of the pilot holes.

4. The mounting bracket of claim 1, wherein the face plate includes a first set of indicia adjacent a top edge of the central opening and a second set of indicia adjacent a bottom edge of the central opening, each set of indicia comprising ruler graduations indicating a distance from the left edge margin of the face plate to the respective ruler graduation.

5. The mounting bracket of claim 4, wherein the indicia further comprises horizontal registration lines.

6. The mounting bracket of claim 5, wherein the horizontal registration lines comprise a first set of horizontal registration lines at spaced locations and a second set of horizontal registration lines at spaced locations, the first set of horizontal registration lines being spaced a first distance from the respective top or bottom edge of the central opening, and the second set of horizontal registration lines being spaced a second distance from the respective top or bottom edge of the central opening, the second distance being different from the first distance.

7. The mounting bracket of claim 1, in combination with an alignment plate configured to be mounted adjacent a rear face of the central opening, the alignment plate including a first flange configured to extend into the central opening and a second flange configured to align a junction box within the central opening.

8. The mounting bracket of claim 7, wherein the first flange extends from the alignment plate in a first direction and the second flange extends from the alignment plate in a second direction generally opposite the first direction.

9. The mounting bracket of claim 7, wherein the alignment plate has a height that generally corresponds to a distance between the first sidewall of the upper channel and the first sidewall of the lower channel to permit the alignment plate to be centered and aligned on the mounting bracket.

10. The mounting bracket of claim 1, further comprising filler clips detachably connected to the face plate adjacent the central opening, the filler clips being configured for attachment to a junction box to align the junction box within the central opening.

11. A method of adjusting a length of a mounting bracket for a junction box comprising
   providing a mounting bracket comprising:
      a face plate having opposite upper and lower edge margins, opposite left and right edge margins, and a central opening;
      an upper channel extending upwardly from the upper edge margin;
      a lower channel extending downwardly from the lower edge margin, each of the upper and lower channels including an enlarged end portion at one end thereof, each enlarged end portion having a width greater than a width of the remainder of the respective channel such that the enlarged end portion is configured to receive a portion of the remainder of the respective channel, wherein each of the enlarged end portions includes a first sidewall extending rearward from the corresponding one of the upper and lower edge margins, a rear wall extending from the first sidewall, and a second side wall extending forward from an upper end of the rear wall and opposing the first side wall to define an open front of the enlarged end portion, wherein each of the upper and lower channels includes a transition portion extending between and connecting the enlarged end portion and the remainder of the respective upper and lower channels, the transition portion gradually increasing in width toward the enlarged end portion;

cutting the mounting bracket at a first cutting location to remove the enlarged end portions of each of the upper and lower channels, wherein the removed enlarged end portions of the upper and lower channels are sized and shaped such that portions of the remainders of the upper and lower channels are capable of entering the removed enlarged end portions of the corresponding upper and lower channels through the open front of the upper and lower channels to nest the upper and lower channels in the removed enlarged end portions;

cutting the mounting bracket at a second cutting location;

inserting portions of the upper and lower channels into the open front of the respective removed enlarged end portions such that each enlarged end portion receives the portion of one of the upper and lower channels; and attaching the removed enlarged end portions to the remainder of the mounting bracket to create a mounting bracket having a length shorter than an initial length of the mounting bracket.

12. The method of claim 11, wherein the face plate includes indicia adjacent the central opening, the indicia comprising ruler graduations indicating a distance from the left edge margin of the face plate to the respective ruler graduation, and further comprising measuring a distance between two adjacent wall studs.

13. The method of claim 12, wherein cutting the mounting bracket at a second cutting location comprises cutting the mounting bracket at a second location corresponding to the ruler graduation marking the measured distance to remove a portion of the mounting bracket, wherein the shorter length corresponds to the measured distance between two adjacent wall studs.

\* \* \* \* \*